US012186247B2

(12) United States Patent
Lacasse et al.

(10) Patent No.: US 12,186,247 B2
(45) Date of Patent: *Jan. 7, 2025

(54) HOSPITAL BED WITH ADJUSTABLE WIDTH

(71) Applicant: UMANO MEDICAL INC., L'Islet (CA)

(72) Inventors: Sylvain Lacasse, Quebec (CA); Frederic Renaud, Charny (CA); Jean-Philippe Beaudet, L'Islet (CA); Jimmy Laflamme, Levis (CA); Jerome Marcotte, Levis (CA); Steve Bolduc, Beaumont (CA); Marco Morin, Levis (CA)

(73) Assignee: UMANO MEDICAL INC., L'Islet (CA)

(*) Notice: Subject to any disclaimer, the term of this patent is extended or adjusted under 35 U.S.C. 154(b) by 752 days.

This patent is subject to a terminal disclaimer.

(21) Appl. No.: 17/086,386

(22) Filed: Oct. 31, 2020

(65) Prior Publication Data

US 2021/0069040 A1 Mar. 11, 2021

Related U.S. Application Data

(63) Continuation of application No. 15/763,089, filed as application No. PCT/IB2016/055721 on Sep. 23, 2016, now Pat. No. 10,849,804.

(60) Provisional application No. 62/222,957, filed on Sep. 24, 2015.

(51) Int. Cl.

| | |
|---|---|
| *A61G 7/002* | (2006.01) |
| *A61G 7/015* | (2006.01) |
| *A61G 7/018* | (2006.01) |
| *A61G 7/05* | (2006.01) |
| *A61G 13/12* | (2006.01) |

(52) U.S. Cl.

CPC ............. *A61G 7/002* (2013.01); *A61G 7/015* (2013.01); *A61G 7/018* (2013.01); *A61G 7/0506* (2013.01); *A61G 13/129* (2013.01); *A61G 2200/16* (2013.01); *A61G 2200/18* (2013.01)

(58) Field of Classification Search

CPC ........ A61G 7/002; A61G 7/015; A61G 7/018; A61G 7/0506; A61G 13/129; A61G 2200/16; A61G 2200/18

See application file for complete search history.

(56) References Cited

U.S. PATENT DOCUMENTS

| | | | | |
|---|---|---|---|---|
| 3,763,979 A * | 10/1973 | Goodman | A61G 7/002 | 192/69.63 |
| 9,622,927 B1 * | 4/2017 | Edgerton | A61G 7/002 | |
| 9,980,575 B2 * | 5/2018 | Dewert | A47C 20/042 | |
| 10,849,804 B2 * | 12/2020 | Lacasse | A61G 7/018 | |

(Continued)

*Primary Examiner* — Myles A Throop

(74) *Attorney, Agent, or Firm* — STEPTOE LLP; Scott Richey

(57) ABSTRACT

A hospital bed comprising: a frame; a plurality of extendable patient support panels mounted to the frame, each patient support panel including a central section and at least one side section selectively movable laterally towards and away from the central section; a movement transmission assembly including at least one transmission member connecting at least two of the movable side sections for laterally moving at least one of the movable side sections when another one of the movable side sections is moved.

19 Claims, 22 Drawing Sheets

(56) References Cited

U.S. PATENT DOCUMENTS

| | | | | |
|---|---|---|---|---|
| 2006/0168728 | A1* | 8/2006 | Strobel | A61G 7/0514 5/618 |
| 2006/0195984 | A1* | 9/2006 | HakamiuN | A61G 7/0514 5/430 |
| 2007/0136949 | A1* | 6/2007 | Richards | A61G 7/05 5/624 |
| 2008/0000028 | A1* | 1/2008 | Lemire | A61G 7/053 5/722 |
| 2013/0298331 | A1* | 11/2013 | Bossingham | A61G 7/018 5/613 |
| 2014/0047641 | A1* | 2/2014 | Thodupunuri | A61G 7/018 5/613 |
| 2014/0215717 | A1* | 8/2014 | Rigsby | A61G 7/0513 5/613 |
| 2015/0128347 | A1* | 5/2015 | Hutchison | A61G 7/018 5/616 |
| 2016/0037937 | A1* | 2/2016 | Dewert | A47C 1/0242 5/616 |
| 2016/0193095 | A1* | 7/2016 | Roussy | A61G 7/0509 5/616 |
| 2016/0287460 | A1* | 10/2016 | Tekulve | A61G 7/002 |
| 2017/0143566 | A1* | 5/2017 | Elku | A61G 7/0506 |
| 2021/0045950 | A1* | 2/2021 | Connell | A61G 7/015 |

* cited by examiner

HOSPITAL BED WITH ADJUSTABLE WIDTH

CROSS-REFERENCE

The present application is a Continuation Application of the U.S. patent application Ser. No. 15/763,089, filed Mar. 23, 2018, entitled "Hospital Bed With Adjustable Width" and allowed as a patent, which is the United States National Stage (371(c)) of International Patent Application Serial No. PCT/IB2016/055721, filed Sep. 23, 2016, which claims priority from U.S. Provisional Patent Application Ser. No. 62/222,957, filed Sep. 24, 2015, entitled "Bed With Powered Width Contraction".

TECHNICAL FIELD

The invention relates to hospital beds, and more specifically to hospital beds with adjustable width.

BACKGROUND

Hospital beds have several functions and uses. Since patients may have different weight and height, beds larger than standard products with an area of about 35×78 inches, or 89 cm×198 cm, may be used.

These larger beds are used for the treatment of tall and/or obese patients. They may also serve to increase the comfort of patients who lie in a bed smaller than a residential bed. They can also be used for parents who want to get closer to their sick child and comfort them by lying with them. They can also be used for delivery rooms by increasing the comfort of a mother giving her more space and allowing the father to be closer to his wife during and after child birth.

Patient movements in hospital beds are necessary and common. Usually the patient is transferred on a stretcher to be able to move more easily from one room to another and in elevators. Some doors have a width of about 42 inches or 107 cm which limits the dimensions of beds that may enter a room. The depth of the elevator also limits the dimensions of beds that may be transported therein. These large hospital beds must be delivered in different rooms and to circulate in hospitals.

In order to overcome the above-described drawbacks of large hospital beds, beds of which the dimensions may be adjusted, i.e. adjustable or extendable beds, have been developed. Some extendable beds are manually operated. In this case, an operator must manually manipulate the bed in order to increase or decrease its surface area. Unfortunately, these beds usually require multiple manipulations to be able to fully adjust the width of the bed to a desired dimension.

Other extendable beds have been provide with motors for automating the extension of the bed. Unfortunately, those motorized beds comprises multiple motors each for moving a respective section of the bed, which is expensive and cumbersome.

Therefore, there is a need for a hospital with adjustable width which would overcome at least one of the above-identified drawbacks.

BRIEF SUMMARY

According to one aspect, there is provided a hospital bed comprising: a frame; a plurality of extendable patient support panels mounted to the frame, each patient support panel including a central section and at least one side section selectively movable laterally towards and away from the central section; a movement transmission assembly including at least one transmission member connecting at least two of the movable side sections for laterally moving at least one of the movable side sections when another one of the movable side sections is moved.

In one embodiment, the at least two of the movable side sections connected by the at least one transmission member includes at least one movable side section of a first patient support panel and at least one movable side section of a second patient support panel.

In one embodiment, the plurality of extendable patient support panels include an upper body support panel, a lower body support panel and at least one core support panels located between the upper body support panel and the lower body support panel.

In one embodiment, the at least one transmission member includes a plurality of flexible transmission members.

In one embodiment, the plurality of flexible transmission members interconnect all of the movable side sections.

In one embodiment, the plurality of flexible transmission members include a plurality of control cables.

In one embodiment, each control cable includes a cable core and a sheath surrounding the cable core.

In one embodiment, the control cables are connected together such that movement of one of the control cables causes movement of at least one other control cable.

In one embodiment, the hospital bed further comprises a width adjustment actuator operatively connected to at least one of the control cables and the side sections to selectively pull the control cables in one of a first direction and a second direction opposite the first direction.

In one embodiment, the width adjustment actuator is a linear actuator.

In one embodiment, the linear actuator has a first end secured to the frame and a second end secured to one of the side section.

In one embodiment, each control cable is connected to one of the movable side sections.

In one embodiment, each control cable has a first cable end connected to a corresponding side section and a second cable end connected to the same corresponding side section.

In one embodiment, the first and second cable ends point towards each other such that pulling the control cable in a first direction moves the corresponding side section laterally in a first lateral direction and pulling the control cable in a second direction opposite the first direction moves the corresponding side section laterally in a first lateral direction opposite the first lateral direction.

In one embodiment, the side section and the corresponding central section are coplanar.

In one embodiment, the side section is slidably connected to the corresponding central section.

In one embodiment, the side section is movable between a stowed position in which the side section is located within the corresponding central section and an extended position in which the side section extends away from the central section.

In one embodiment, the side section is further movable to a plurality of intermediate positions located between the stowed position and the extended position.

In one embodiment, the plurality of intermediate positions includes a plurality of predetermined discrete positions.

In one embodiment, the bed further includes a slide mechanism to allow sliding movement of the side section relative to the central section.

In one embodiment, the slide mechanism includes a first slide member secured to at least one of the frame and the central section and a second slide member secured to the side section, the second slide member being slidably connected to the first slide member.

In one embodiment, the first slide member includes a sleeve and the second slide member includes a rod slidably engaging the sleeve.

In one embodiment, the sleeve includes a first bore for receiving a first rod secured to a first side section and a second bore parallel to the first bore for receiving a second rod secured to a second side section located opposite the first side section.

In one embodiment, the hospital bed further comprises an extendable headboard mounted to the frame, the headboard having a first headboard portion and a second headboard portion slidably connected to the first headboard portion, the first and second headboard portion being operatively connected to the movement transmission assembly for selectively moving the first and second headboard portions towards and away from each other when at least one of the side section is moved laterally.

In one embodiment, the hospital bed further comprises a manual actuation assembly including a threaded rod connected to one of the side sections and an internally-threaded nut secured to the frame such that manual rotation of the threaded rod causes axial translation of the one of the side sections relative to the frame.

In one embodiment, the hospital bed further comprises a width locking assembly operatively connected to at least one of the side sections, the width locking assembly being movable between a locked configuration in which lateral movement of the side sections is prevented and an unlocked configuration which allows lateral movement of the side sections.

Figure 1:
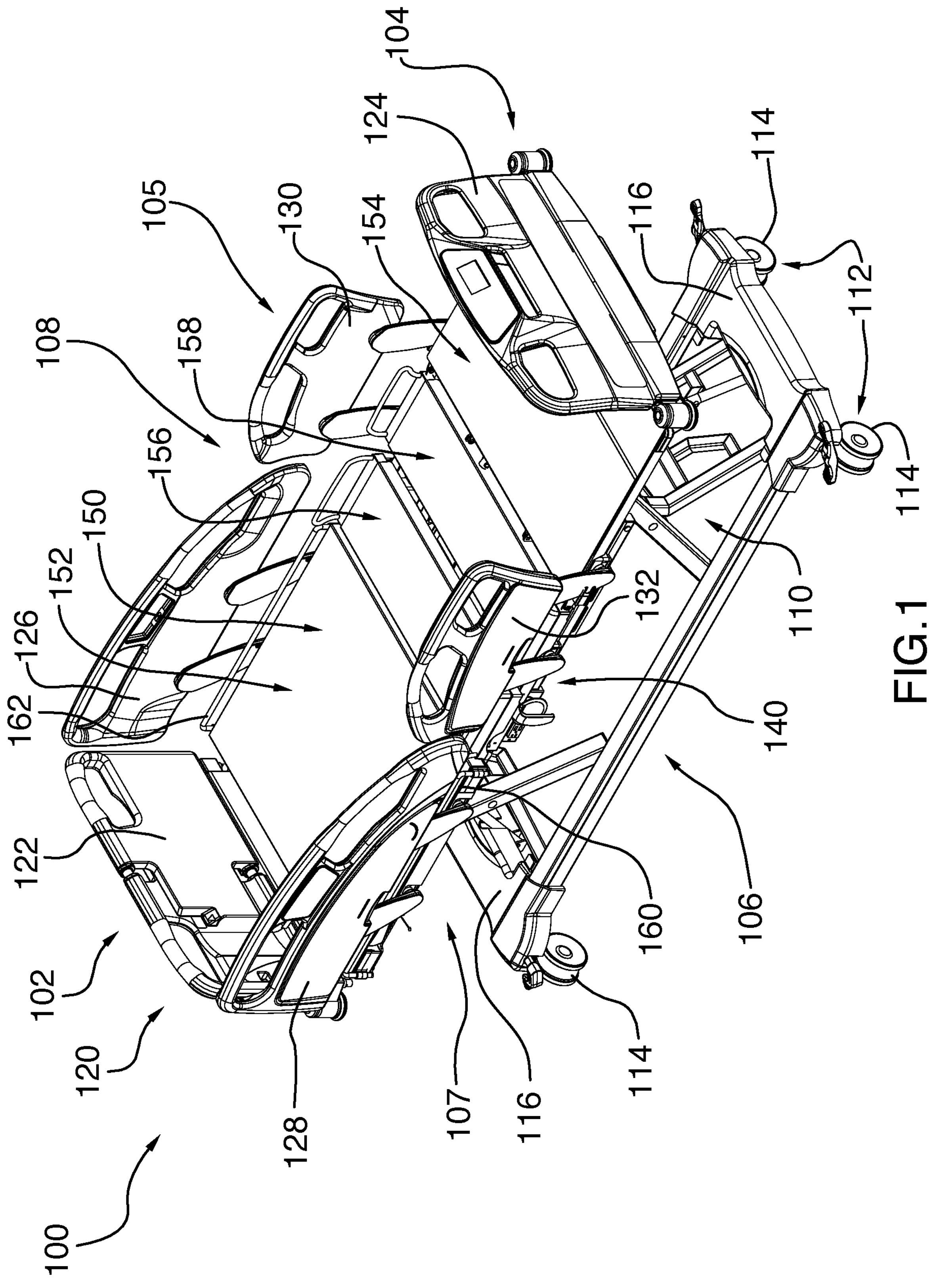
FIG. 1 is a top perspective view of a hospital bed, in accordance with one embodiment.

Further details of the invention and its advantages will be apparent from the detailed description included below.

DETAILED DESCRIPTION

In the following description of the embodiments, references to the accompanying drawings are by way of illustration of an example by which the invention may be practiced. It will be understood that other embodiments may be made without departing from the scope of the invention disclosed.

Referring first to FIGS. 1 to 5, there is shown a hospital bed 100, in accordance with one embodiment. The bed 100 comprises a head end 102, an opposite foot end 104 and spaced-apart left and right sides 105, 107 extending between the head end 102 and the foot end 104.

Some of the structural components of the bed 100 will be designated hereinafter as "right", "left", "head" and "foot" from the reference point of an individual lying on the individual's back on the support surface of the mattress provided on the bed 100 with the individual's head oriented toward the head end 102 of the bed 100 and the individual's feet oriented toward the foot end 104 of the bed 100.

The bed 100 includes a base 106, a patient support assembly 108 and an elevation system 110 operatively coupling the patient support assembly 108 to the base 106. In the illustrated embodiment, the base 106 is provided with a displacement assembly 112 which includes casters 114 connected to the base 106 by pivots (not shown) hidden from view by covers 116. This displacement assembly 112 allows the bed 100 to be moved and maneuvered along a floor. In one embodiment, the base is at a distance of 5 inches from the floor. Alternatively, the base could be higher or lower than 5 inches from the floor.

The elevation system 110 is configured to raise and lower the patient support assembly 108 relative to the base 106 between a minimum or fully lowered position and a maximum or fully raised position. In one embodiment, the elevation system 110 is further configured to allow the patient support assembly 108 to be set at any intermediate position between the fully lowered and fully raised positions. The elevation system 110 may further be configured to tilt the patient support assembly 108 in various orientations, as will be further explained below.

Still referring to FIGS. 1 to 5, the bed 100 further includes a patient support barrier system 120 generally disposed around the patient support assembly 108. The barrier system 120 includes a plurality of barriers which extend generally vertically around the patient support assembly 108. In the illustrated embodiment, the plurality of barriers includes a headboard 122 located at the head end 102 and a footboard 124 disposed generally parallel to the headboard 122 and located at the foot end 104 of the bed 100. The plurality of barriers further include spaced-apart left and right head siderails 126, 128 which are located adjacent the headboard 122 and spaced-apart left and right foot siderails 130, 132 which are respectively located between the left and right head siderails 126, 128 and the foot end 104 of the bed 100. Each siderail 126, 128, 130, 132 is moveable between an extended or raised position for preventing the patient lying on the bed 100 from moving laterally out of the bed 100 (i.e. exit the bed 100), and a retracted or lowered position for allowing the patient to move or be moved laterally out of the bed 100.

The bed 100 further includes a control interface (not shown) for controlling features of the bed 100. The control interface could be integrated into the footboard 124, into the headboard 122 or into one or more of the siderails 126, 128, 130, 132. Alternatively, the control interface could be provided as a separate unit located near the bed 100 or even at a location remote from the bed 100. In one embodiment, the control interface is operatively connected to the elevation system 110 to control the height of the patient support assembly 108 above the floor.

Still referring to FIGS. 1 to 5, the patient support assembly 108 includes a frame 140 (best shown in FIG. 4) and a patient support surface 150 supported by the frame 140. In the illustrated embodiment, the patient support surface 150 includes an upper body surface or upper body support panel 152, a lower body surface or lower body support panel 154 and one or more core body surfaces or core support panels 156, 158 located between the backrest 152 and the lower body support panel 154 for supporting the seat and/or thighs of the patient. Specifically, the one or more core support panels 156, 158 include a first core support panel 156 located adjacent the upper body support panel 152 and a second core support panel 158 located adjacent the lower body support panel 154. In the illustrated embodiment, each one of the backrest 152, the lower body support panel 154 and the core support panels 156, 158 can be angled relative to the other surfaces.

A lying surface such as a mattress or the like, not shown, is typically provided on the patient support surface 150 for receiving the patient thereon. Each one of the backrest 152 and the lower body support panel 154 can include a right loop 160 and a left loop 162 which extend above the patient support surface 150 to retain the mattress onto the patient support surface 150. The right and left loops 160, 162 can also be used for hooking on accessories (not shown) used for patient treatment to the bed 100. In the illustrated embodiment, the core support panel 156 further includes a left retainer 164 and a right retainer 166 which can also be used for retaining the mattress onto the patient support surface 150 and for hooking on accessories.

Figure 3:
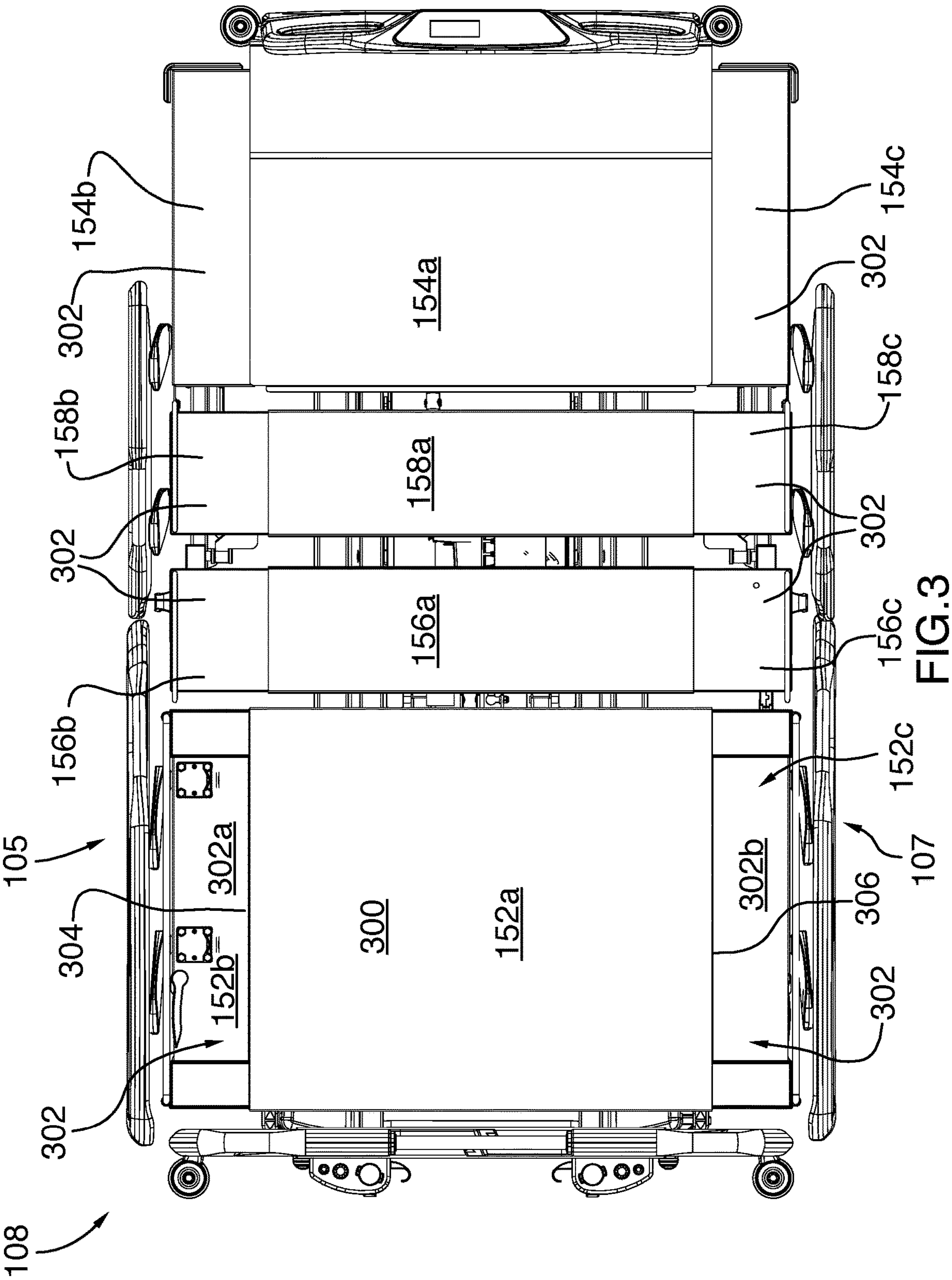
FIG. 3 is a top plan view of a patient support assembly for the hospital bed illustrated in FIG. 1, with the bed in an extended configuration in which the side sections of the patient support surface are in an extended position.
Figure 4:
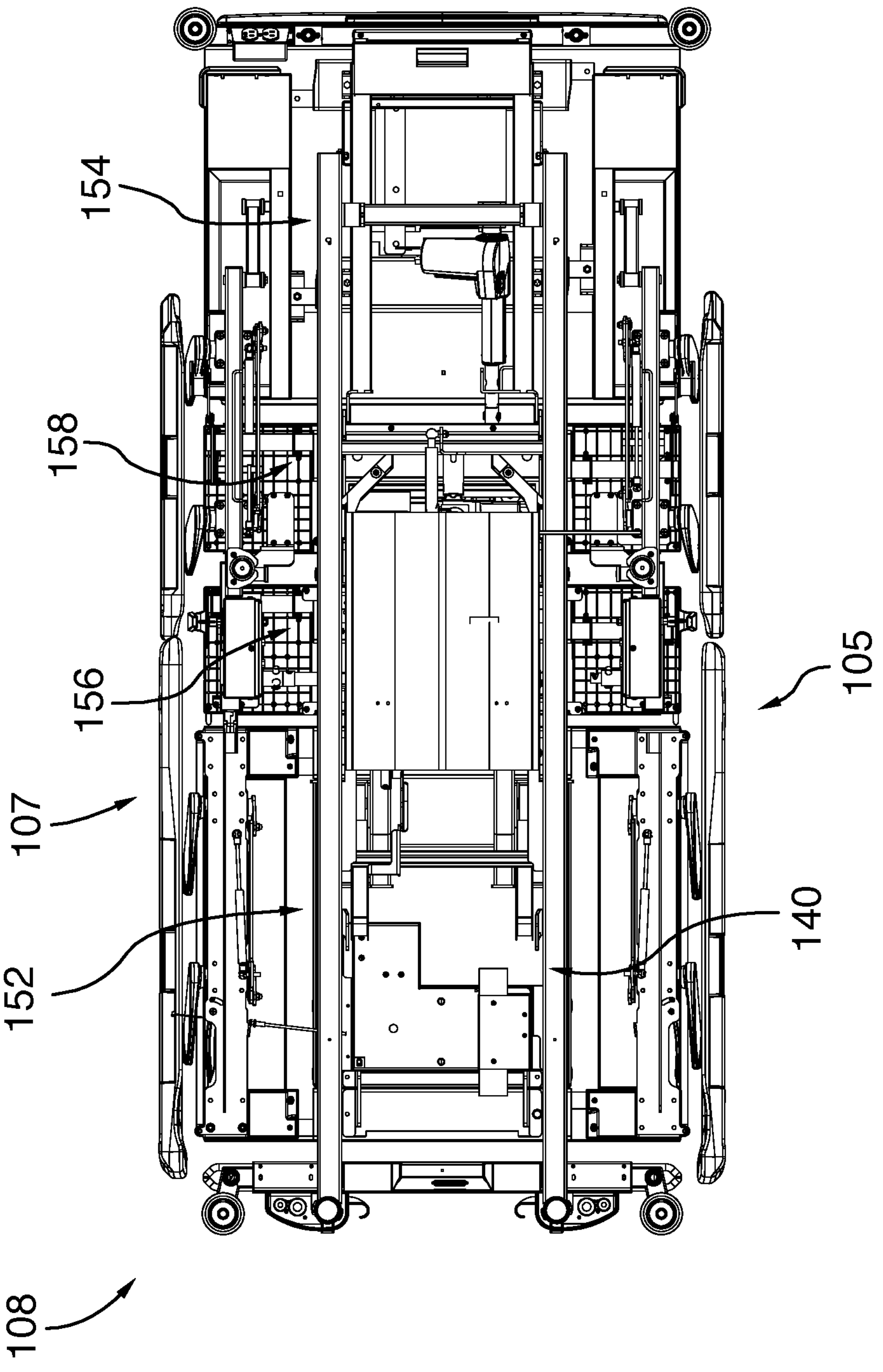
FIG. 4 is a bottom plan view of the patient support assembly illustrated in FIG. 2.
Figure 5:
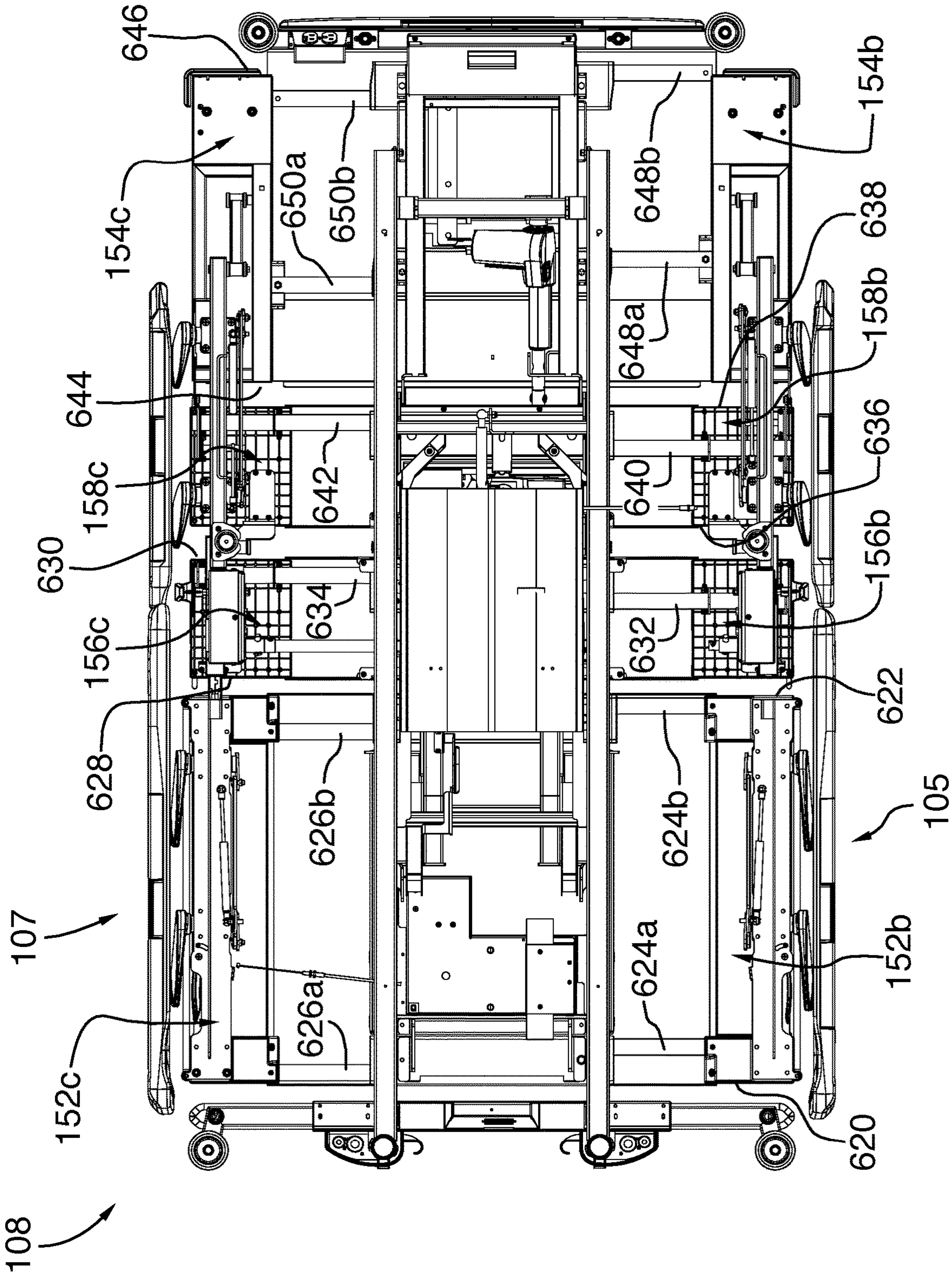
FIG. 5 is a bottom plan view of the patient support assembly illustrated in FIG. 3.

Referring specifically to FIGS. 3 and 5, the width of the patient support surface 150 is further adjustable. Specifically, each one of the support panels 152, 154, 156, 158 includes a central section 300 and at least one side section 302 which is selectively movable laterally towards and away from the central section 300 to thereby adjust the width of the patient support surface 150. In the illustrated embodiment, each support panel 152, 154, 156, 158 includes a left side section **302*a* configured for extending from a left side 304 of the central section 300 and a right side section 302*b* configured for extending from a right side 306 of the central section 300**.

Specifically, the backrest 152 includes a central backrest section **152*a*, a left backrest side section 152*b* and a right backrest side section 152*c*. The lower body support panel 154 includes a central lower panel section 154*a*, a left lower panel side section 154*b* and a right lower panel side section 154*c*. The first core support panel 156 includes a central first core section 156*a*, a left first core side section 156*b* and a right first core side section 156*c*. The second core support panel 158 includes a central second core section 158*a*, a left second core side section 158*b* and a right second core side section 158*c***.

Each side section 302 is movable between a stowed position in which the side section 302 is located within the corresponding central section 300 and an extended position in which the side section 302 extends away from the central section 300. In the illustrated embodiment, when the side section 302 is in the stowed position, the central section 300 completely overlaps the side section 302 such that the side section 302 is hidden when viewed from above. Alternatively, when the side section 302 is in the stowed position, the side section 302 could still extend beyond the left side 304 or the right side 306 of the central section 300 such that the side section 302 is still visible when viewed from above.

In one embodiment, each side section 302 is further movable to a plurality of intermediate positions located between the stowed position and the extended position. This allows the width of the bed 100 to be set to a desired width according to a width of a mattress to be received on the patient support surface 150, to a size of a patient to be received on the bed 100, to a width of a space available for storage of the bed 100, to a width of a passage such as a doorframe through which the bed 100 must pass or to any other consideration that a skilled person may deem relevant.

In one embodiment, the plurality of intermediate positions could include a plurality of predetermined, discrete positions. Alternatively, the plurality of intermediate positions include all possible positions between the stowed position and the extended position.

In the illustrated embodiment, each side section 302 is slidably connected to the central section 300. More specifically, each side section 302 and the corresponding central section 300 are coplanar, such that the side section 302 extends in the same plane as the corresponding central section 300 and moves along this plane when it slides towards and away from the central section 300.

Still in the illustrated embodiment, the headboard 112 is also selectively extendable and contractible, as will be further explained below, and its width can also be adjusted according to the width of the patient support surface 150. Alternatively, the headboard 112 may not be extendable or contractible.

Turning to FIGS. 6 to 8D, each side section 300 is connected to a slide mechanism 600 which allows sliding movement of the side section 302 relative to the central section 300. Specifically, the slide mechanism 600 includes a first slide member 602 secured to at least one of the frame 140 and the central section 300 and a second slide member 604 secured to the side section 302, the second slide member 604 being slidably connected to the first slide member 602.

In the illustrated embodiment, the first slide member 602 includes a sleeve 606 and the second slide member 604 includes at least one rod 608*a*, 608*b* slidably engaging the sleeve 606. Specifically, the sleeve 606 includes a single, integral body 610 defining a first bore 612 and a second bore 614 disposed parallel to the first bore 612. In one embodiment, the sleeve 606 is secured to the frame 140. Alternatively, the sleeve 606 could be secured to the underside of the central section 300 or could be secured to both the frame 140 and the underside of the central section 300.

Still in the illustrated embodiment, the first bore 612 is adapted to receive a first rod 608*a* and the second bore 614 is adapted to receive a second rod 608*b*. More specifically, each rod 608*a*, 608*b* includes an inner rod end 616 which is located inside the corresponding bore 612, 614 and an outer rod end 618 located away from the inner rod end 616.

Referring back to FIG. 5, each side section 302 is secured to the outer rod end 618 of at least one of the rods 608. In the illustrated embodiment, each one of the left and right backrest side sections 152*b*, 152*c* has a headward end 620 located towards the head end 102 of the bed 100 and a footward end 622 located towards the foot end 104 of the bed 100. The left backrest side section 152*b* is secured to a first left rod 624*a* at the headward end 620 of the left backrest side section 152*b* and to a second left rod 624*b* at the footward end 622 of the left backrest side section 152*b*. The right backrest side section 152*c* is similarly secured to a first right rod 626*a* at the headward end 620 of the right backrest side section 152*c* and to a second right rod 626*b* at the footward end 622 of the right backrest side section 152*c*. Alternatively, the backrest side sections 152*b*, 152*c* could be secured to only a single rod, or to more than two rods.

Still referring to FIG. 5, each one of the left and right first core side sections 156*b*, 156*c* has a headward end 628 located towards the head end 102 of the bed 100 and a footward end 630 located towards the foot end 104 of the bed 100. The left first core side section 156*b* is secured to a left rod 632 at the footward end 630 of the left first core side section 156*b* and the right first core side section 156*c* is secured to a right rod 634 at the footward end 630 of the left first core side section 156*b*.

Similarly, each one of the left and right second core side sections 158*b*, 158*c* has a headward end 636 located towards the head end 102 of the bed 100 and a footward end 638 located towards the foot end 104 of the bed 100. The left second core side section 158*b* is secured to a left rod 640 at the footward end 638 of the left second core side section 158*b* and the right second core side section 158*c* is secured to a right rod 642 at the footward end 638 of the left second core side section 158*b*.

In the illustrated embodiment, each one of the left and right lower panel side sections 154*b*, 154*c* has a headward end 644 located towards the head end 102 of the bed 100 and a footward end 646 located towards the foot end 104 of the bed 100. The left lower panel side section 154*b* is secured to a first left rod 648*a* at the headward end 644 of the left lower panel side section 154*b* and to a second left rod 648*b* at the footward end 646 of the left lower panel side section 154*b*. The right lower panel side section 154*c* is similarly secured to a first right rod 650*a* at the headward end 644 of the right lower panel side section 154*c* and to a second right rod 650*b* at the footward end 622 of the right lower panel side section 154*c*. Alternatively, the lower panel side sections 154*b*, 154*c* could be secured to only a single rod, or to more than two rods.

Referring back to FIGS. 6 to 8D, the first and second bores 612, 614 of the sleeve 606 are in communication with each other inside the sleeve 606 in the illustrated embodiment. Specifically, the first and second bores 612, 614 are spaced from each other to define a central cavity 660 therebetween. Alternatively, the first and second bores 612, 614 could be separated by a central dividing wall which could extend lengthwise within the sleeve 606. In yet another embodiment, the sleeve 606 could comprise two distinct tubes disposed side-by-side instead of a single, integral body.

In the illustrated embodiment, each bore 612, 614 has a circular cross-section and the corresponding rod 608*a*, 608*b* has a corresponding circular cross-section. Alternatively, the bores 612, 614 and corresponding rods 608*a*, 608*b* could have corresponding square cross-sections, semicircular cross-sections or any other shape that a skilled person would consider suitable.

Still in the illustrated embodiment, the slide mechanism 600 further includes a plurality of roller assemblies 800 to reduce friction between the rods 608*a*, 608*b* and the sleeve 606. More specifically, each rod 608*a*, 608*b* is hollow and includes a cylindrical sidewall 802. Each roller assembly 800 is located within the cylindrical wall 802 and includes an axle 804 extending transversely to a longitudinal axis of the rod 608*a*, 608*b* and a roller 806 rotatably mounted to the axle 804. The axle 804 is disposed such that the roller 804 extends on each side through opposite slots 808 defined in the sidewall 802.

In the illustrated embodiment, the slide mechanism includes a pair of outer roller assemblies 800*a* spaced apart longitudinally along the rod and a pair of inner roller assemblies 800*b* located longitudinally between the outer roller assemblies 800*a*. The axles 804 of the outer roller assemblies 800*a* are orthogonal to the axles 804 of the inner roller assemblies 800*b*. More specifically, when the rods 608*a*, 608*b* are positioned within their respective bores 612, 614, the axle 804 of the outer roller assemblies 800*a* are generally horizontal and the axle 804 of the inner roller assemblies 800*b* are generally vertical.

It will be appreciated that the roller assemblies 800 could instead be disposed according to one of various alternative arrangements.

Still referring to FIGS. 6 to 8D, each rod 608*a*, 608*b* further may further include a hook member 850 which extends into the central cavity 660 between the first and second bores 612, 614, towards the other rod 608*b*, 608*a*, when the rods 608*a*, 608*b* are received in the sleeve 606. Specifically, the hook member 850 is spaced from the inner rod end 616 and is adapted to be connected to an end of a control cable, as will be explained further below. In the illustrated embodiment, each rod 608*a*, 608*b* further comprises a cable end connector 852 located at the inner rod end 616. The cable end connector 852 is also adapted to be connected to an end of a control cable.

Figure 9:
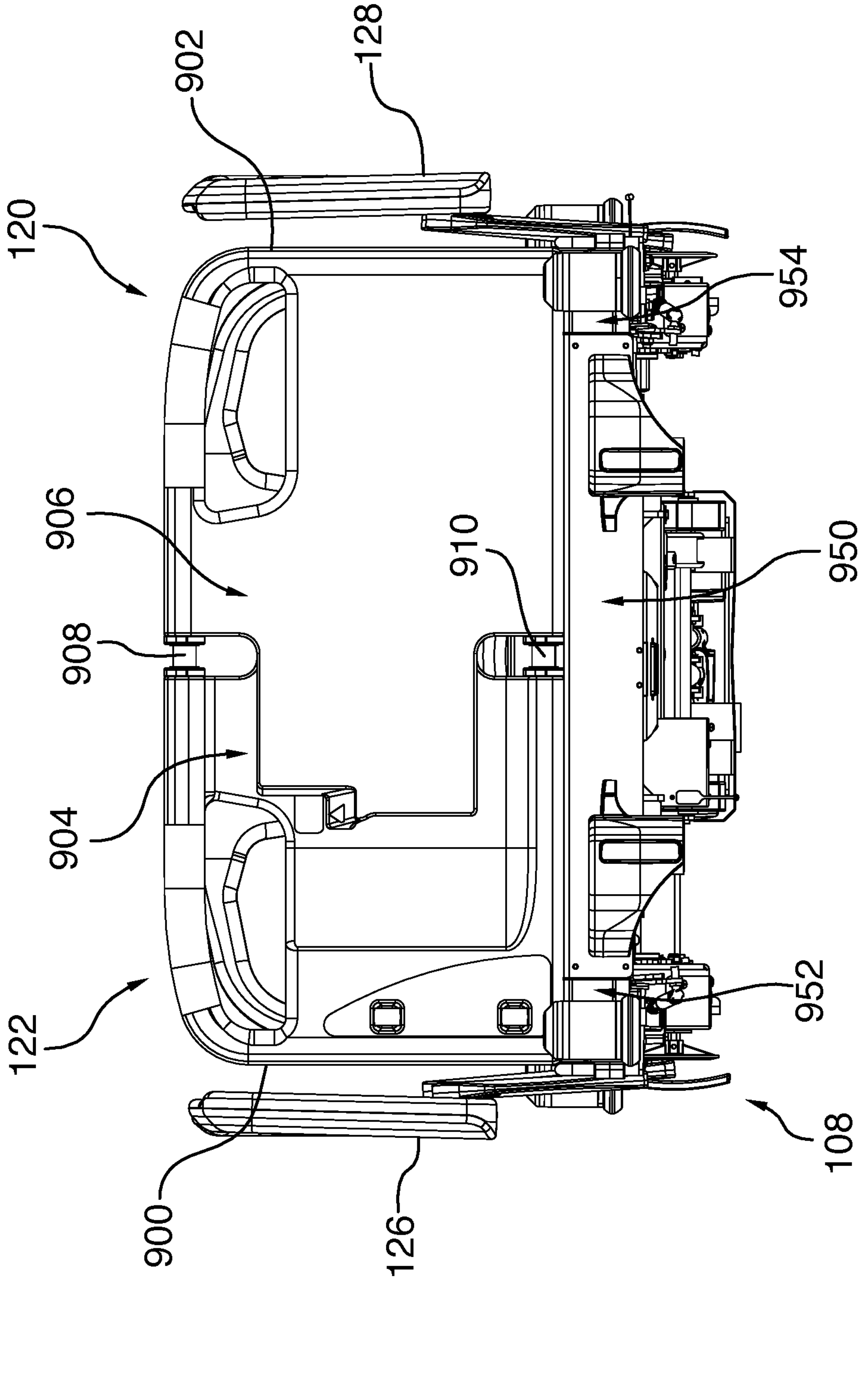
FIG. 9 is a front view of a headboard for the hospital bed illustrated in FIG. 1, with the headboard in a contracted configuration.
Figure 9A:
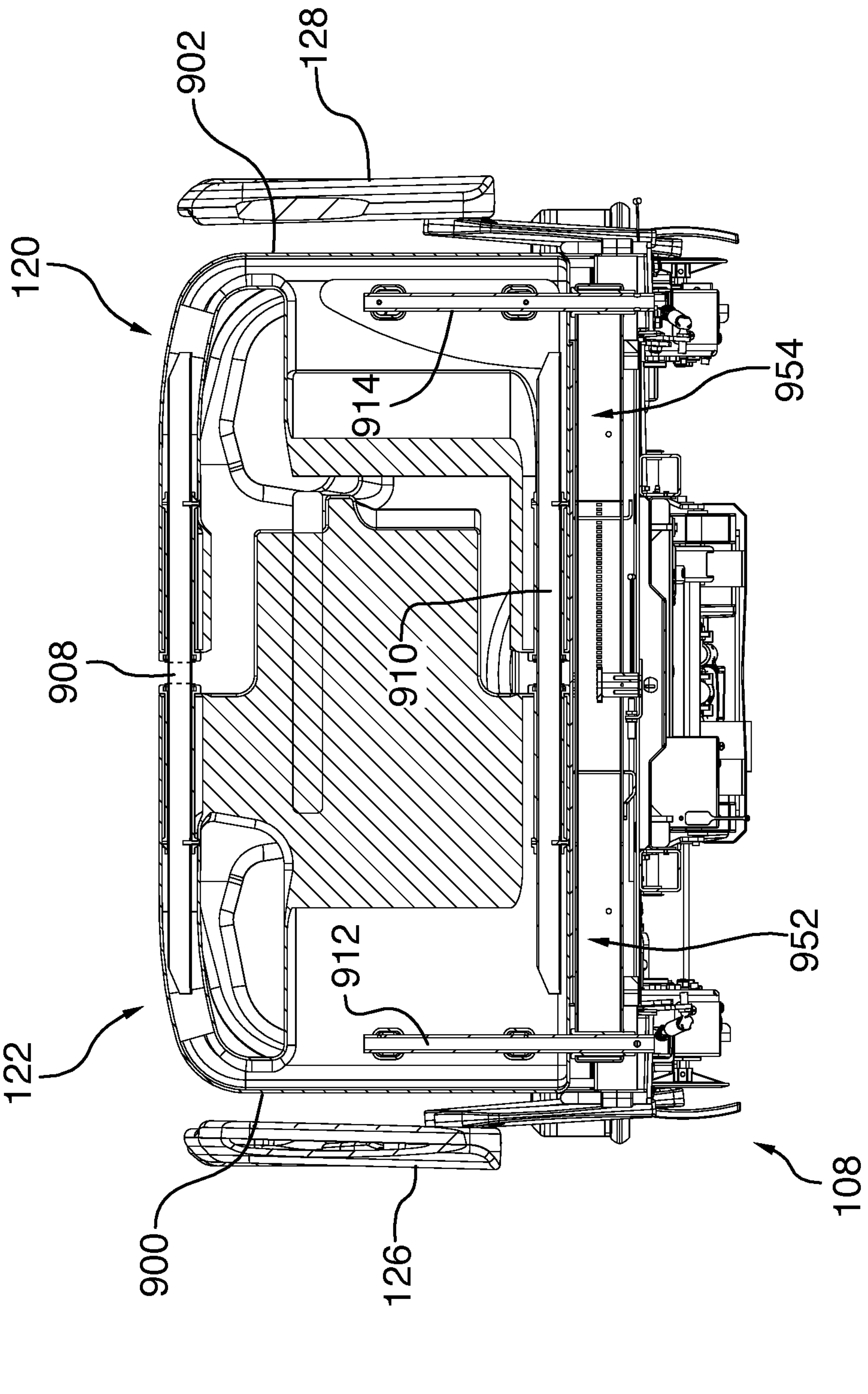
FIG. 9A is a cutaway view of the headboard illustrated in FIG. 9, to show the headboard's mounting posts being received in the left and right extension members of the head frame member.
Figure 10:
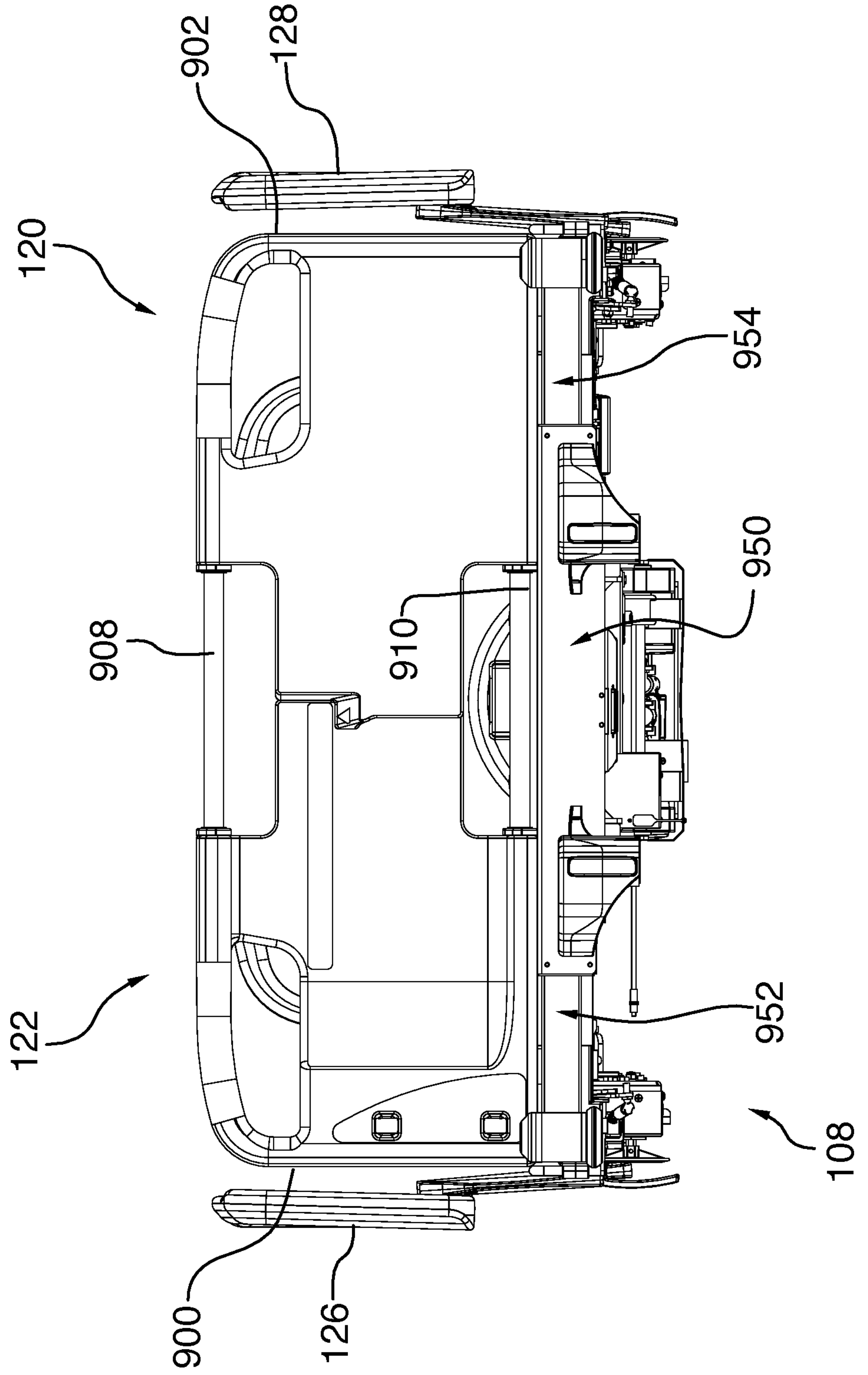
FIG. 10 is a front view of a headboard for the hospital bed illustrated in FIG. 1, with the headboard in an extended configuration.
Figure 11:
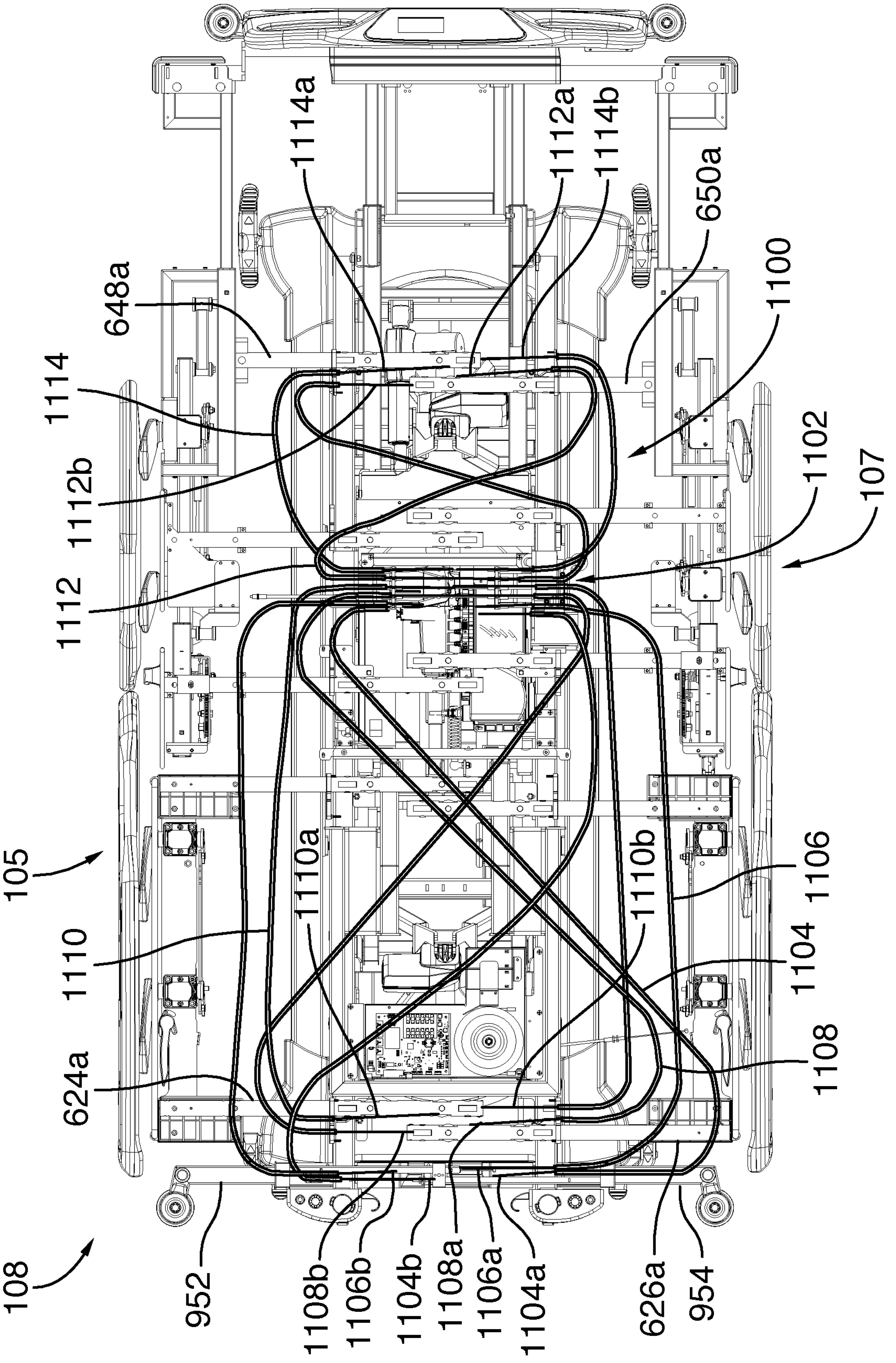
FIG. 11 is a top plan view of the patient support assembly illustrated in FIG. 2, with the central sections of the patient support surface and the sleeves of the slide mechanism removed and the control cables shown schematically.

Now turning to FIGS. 9 to 10, the width of the headboard 122 may also be adjusted as the width of the patient support surface 150 is adjusted to prevent substantial gaps from being created between the headboard 122 and the left and right head siderails 126, 128 when the patient support surface 150 is widened.

In the illustrated embodiment, the left and right head siderails 126, 128 are secured respectively to the left and right backrest side sections 152*b*, 152*c*. When the left and right backrest side sections 152*b*, 152*c* are in the stowed position, the left and right head siderails 126, 128 are positioned adjacent the headboard 122. Specifically, the headboard 122 is generally rectangular and has left and right side edges 900, 902 which are straight, parallel to each other and generally vertical. In this configuration, the distance between the left and right head siderails 126, 128 is substantially similar to the width of the headboard 122, such that there is substantially no gap between the left head siderail 126 and the left side edge and between the right head siderail 128 and the right side edge. This prevents body parts or other objects from getting caught between the left and right head siderails 126, 128 and the headboard 122.

As the left and right backrest side sections 152*b*, 152*c* are extended from their stowed position to their extended position, it will be understood that the distance between the left and right head siderails 126, 128 increases. The headboard 122 is adapted to be selectively extended and contracted simultaneously with the patient support surface 150 at the same speed as the patient support surface 150 such that during extension or contraction of the patient support surface 150, no gap is created between the left head siderail 126 and the headboard's left side edge 900 and between the right head siderail 128 and the headboard's right side edge 902.

In the illustrated embodiment, the headboard 122 includes a left headboard portion 904 and a right headboard portion 906 slidably connected to the left headboard portion 904. More specifically, the headboard 122 includes upper and lower horizontal guide rods 908, 910 which slidably engage both the left and right headboard portions 904, 906.

Still in the illustrated embodiment, the headboard 122 is mounted to a hollow head frame member 950 of the frame 140. The hollow head frame member 950 is generally horizontal and extends transversely to a longitudinal axis of the bed 100. The hollow head frame member 950 houses a left extension member 952 which is adapted to extend leftwardly from the head frame member 950 and a right extension member 954 which is adapted to extend rightwardly from the head frame member 950.

The headboard 122 includes a left mounting post 912 extending downwardly from the left headboard portion 904 near the left side edge 900 and a right mounting post 914 extending downwardly from the right headboard portion 906 near the right side edge 902. The left mounting post 912 engages the left extension member 952 and the right mounting post 914 engages the right extension member 954. To extend or contract the headboard, the user the left and right extension members move laterally away from each other transversely to the longitudinal axis of the bed 100, thereby pulling away from each other the left and right headboard portions 904, 906 which slide on the upper and lower horizontal guide rods 908, 910.

Figure 2:
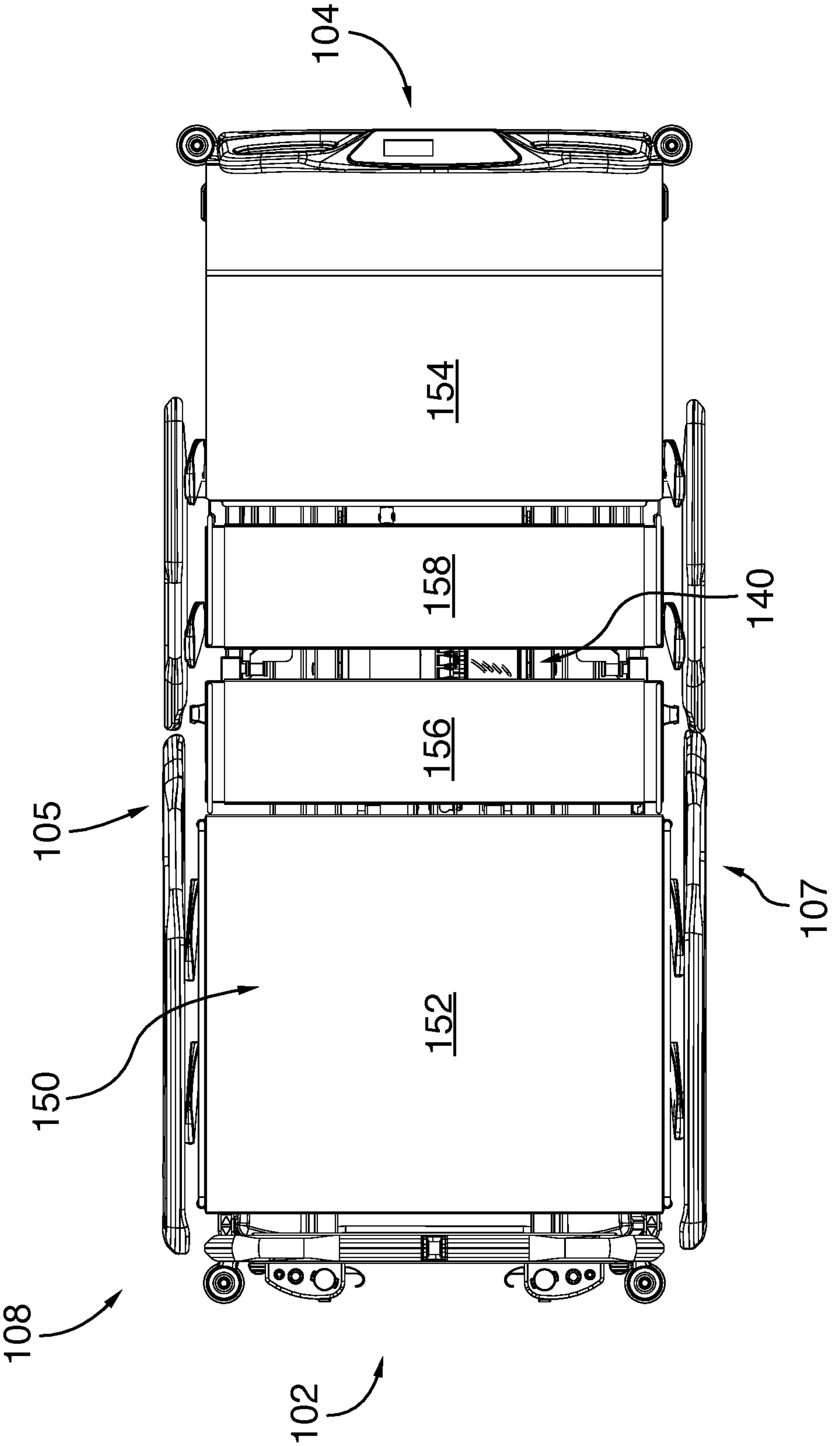
FIG. 2 is a top plan view of a patient support assembly for the hospital bed illustrated in FIG. 1, with the bed in a contracted configuration in which the side sections of the patient support surface are in a stowed position.

Still in the illustrated embodiment, the left and right headboard portions 904, 906 overlap each other and are substantially complementary in shape such that the headboard 122 maintains the same thickness as the left and right headboard portions 904, 906 slide towards each other, as best shown in FIGS. 2 and 3. Alternatively, instead of overlapping each other, one of the left and right headboard portions 904, 906 could include an internal cavity sized and shaped to receive and encase at least part of the other one of the left and right headboard portions 904, 906.

It will be appreciated that instead of being generally rectangular and having left and right sides edges that are straight, the left and right side edges could be curved or have any other shape that a skilled person would consider suitable.

Referring now to FIGS. 11 to 14, the patient support assembly 108 further includes a movement transmission assembly 1100 including at least one transmission member connecting at least two of the movable side sections for laterally moving at least one of the movable side sections when another one of the movable side sections is moved.

In the illustrated embodiment, the transmission assembly 1100 includes a plurality of flexible transmission members which interconnect all the side sections 302*a*, 302*b* and the headboard 112. In this configuration, when a single one of the side sections 302*a*, 302*b* is moved laterally, all of the other side sections 302*a*, 302*b* are also moved laterally and the headboard 112 is expanded or contracted.

Furthermore, when the single one of the side sections 302*a*, 302*b* is moved laterally in a given direction and by a given distance, all of the other side sections 302*a*, 302*b* are moved laterally in the same given direction and by the same given distance. This allows the entire bed 100 to be expanded or contracted by moving only a single one of the side sections 302*a*, 302*b*.

In the illustrated embodiment, the plurality of transmission members includes a plurality of control cables 1102. Each control cable 1102 has a first cable end connected to a corresponding side section and a second cable end also connected to the same corresponding side section. More specifically, the first and second cable ends are connected to one of the rods, such that pulling the control cable in a first axial direction moves the rod, and therefore the side section secured to the rod, laterally in a first lateral direction and pulling the control cable in a second axial direction opposite the first direction moves the rod and the corresponding side section laterally in a second lateral direction opposite the first lateral direction.

Specifically, the plurality of control cables 1102 include a first control cable 1104 having a first end 1104*a* and a second end 1104*b* both connected to the right extension member 954 of the head frame member 950. The first and second ends 1104*a*, 1104*b* of the first control cable 1104 point towards each other such that from the first end 1104*a*, the first control cable 1104 extends away from the second end 1104*b* and forms a loop around to the second end 1104*b*. In the illustrated embodiment, the first control cable includes a first linear portion which is adjacent the first end and a second linear portion which is adjacent the second end, both the first and second linear portions being generally transversely to the bed 100 such that pulling the first control cable 1104 in the first or the second direction moves the right extension member 954 transversely to the bed 100.

The plurality of control cables 1102 further includes a second control cable 1106 having a first end 1106*a* and a second end 1106*b* both connected to the left extension member 952 of the head frame member 950. The second control cable 1106 is configured generally similarly to the first control cable 1104, except that the first control cable 1104 is crossed and the second control cable 1106 is not crossed to allow the left extension member 952 to move in a direction opposite the right extension member 954, as will be explained further below. Alternatively, the second control cable 1106 could instead be crossed and the first control cable 1104 could not be crossed.

The plurality of control cables 1102 further includes a third control cable 1108 having a first end 1108*a* and a second end 1108*b* both connected to the first left rod 624*a* of the left backrest side section 152*b*. The third control cable 1108 is configured generally similarly to the first control cable 1104.

The plurality of control cables 1102 further includes a fourth control cable 1110 having a first end 1110*a* and a second end 1110*b* both connected to the first right rod 626*a* of the right backrest side section 152*c*. The fourth control cable 1110 is configured generally similarly to the second control cable 1106. Specifically, the third control cable 1108 is crossed and the fourth control cable 1110 is not crossed to allow the right backrest side section 152*c* to move in a direction opposite the left backrest side section 152*b*, as will be explained further below. Alternatively, the fourth control cable 1110 could instead be crossed and the third control cable 1108 could not be crossed.

The plurality of control cables 1102 further includes a fifth control cable 1112 having a first end 1112*a* and a second end 1112*b* both connected to the first right rod 650*a* of the right lower panel side section 154*c*. The fifth control cable 1112 is configured generally similarly to the first and third control cables 1104, 1108.

The plurality of control cables 1102 further includes a sixth control cable 1114 having a first end 1114*a* and a second end 1114*b* both connected to the first left rod 648*a* of the left lower panel side section 154*b*. The fifth control cable 1112 is configured generally similarly to the second and fourth control cables 1106, 1110. Specifically, the fifth control cable 1112 is crossed and the sixth control cable 1114 is not crossed to allow the right backrest side section 152*c* to move in a direction opposite the left backrest side section 152*b*, as will be explained further below. Alternatively, the fourth control cable 1110 could instead be crossed and the third control cable 1108 could not be crossed.

In the present embodiment, the left first core side section 156*b* and the left second core side section 158*b* are connected together by a first left rigid link 1150 which causes the left first core side section 156*b* and the left second core side section 158*b* to move laterally together as one. Similarly, the right first core side section 156*c* and the right second core side section 158*c* are connected together by a first right rigid link 1152 which causes the right first core side section 156*c* and the right second core side section 158*c* to move laterally together as one.

Alternatively, the left and right rods 640, 642 of the left and right second core side sections 158*b*, 158*c* could also be connected to a seventh control cable which would cause the left and right second core side sections 158*b*, 158*c* to move simultaneously with the other side sections.

In one embodiment, the left second core side section 158*b* could also be connected to the left lower panel side section 154*b* by a second left rigid link to cause the left second core side section 158*b* and the left lower panel side section 154*b* to move laterally together as one. Similarly, the right second core side section 158*c* could also be connected to the right lower panel side section 154*c* by a second right rigid link to cause the right second core side section 158*c* and the right lower panel side section 154*c* to move laterally together as one. Alternatively, the left and right second core side sections 158*b*, 158*c* may not be connected to the left and right lower panel side sections 154*b*, 154*c* by rigid links.

Figure 12:
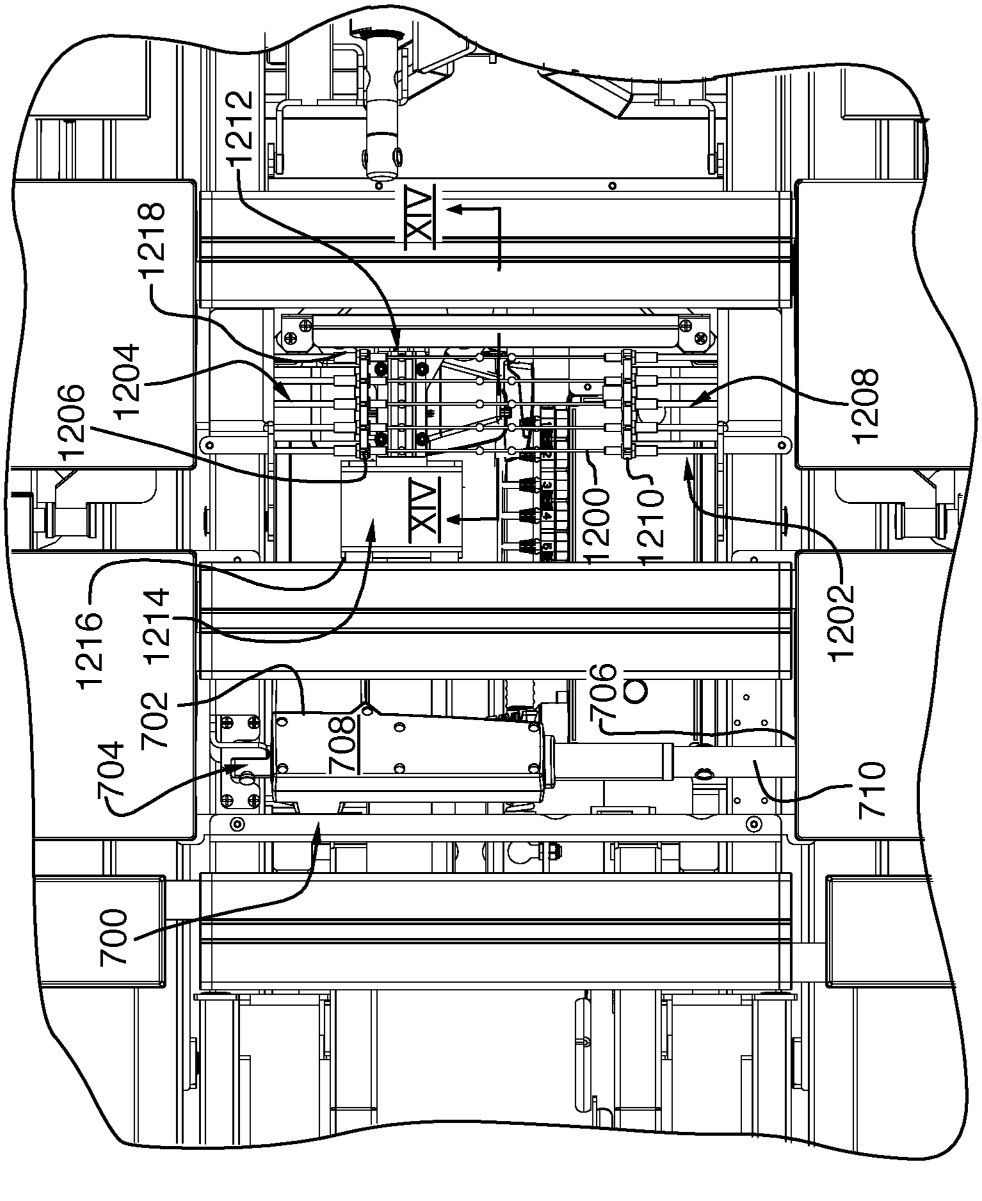
FIG. 12 is an enlarged top plan view of the patient support assembly illustrated in FIG. 11, showing details of the movement transmission assembly.
Figure 13:
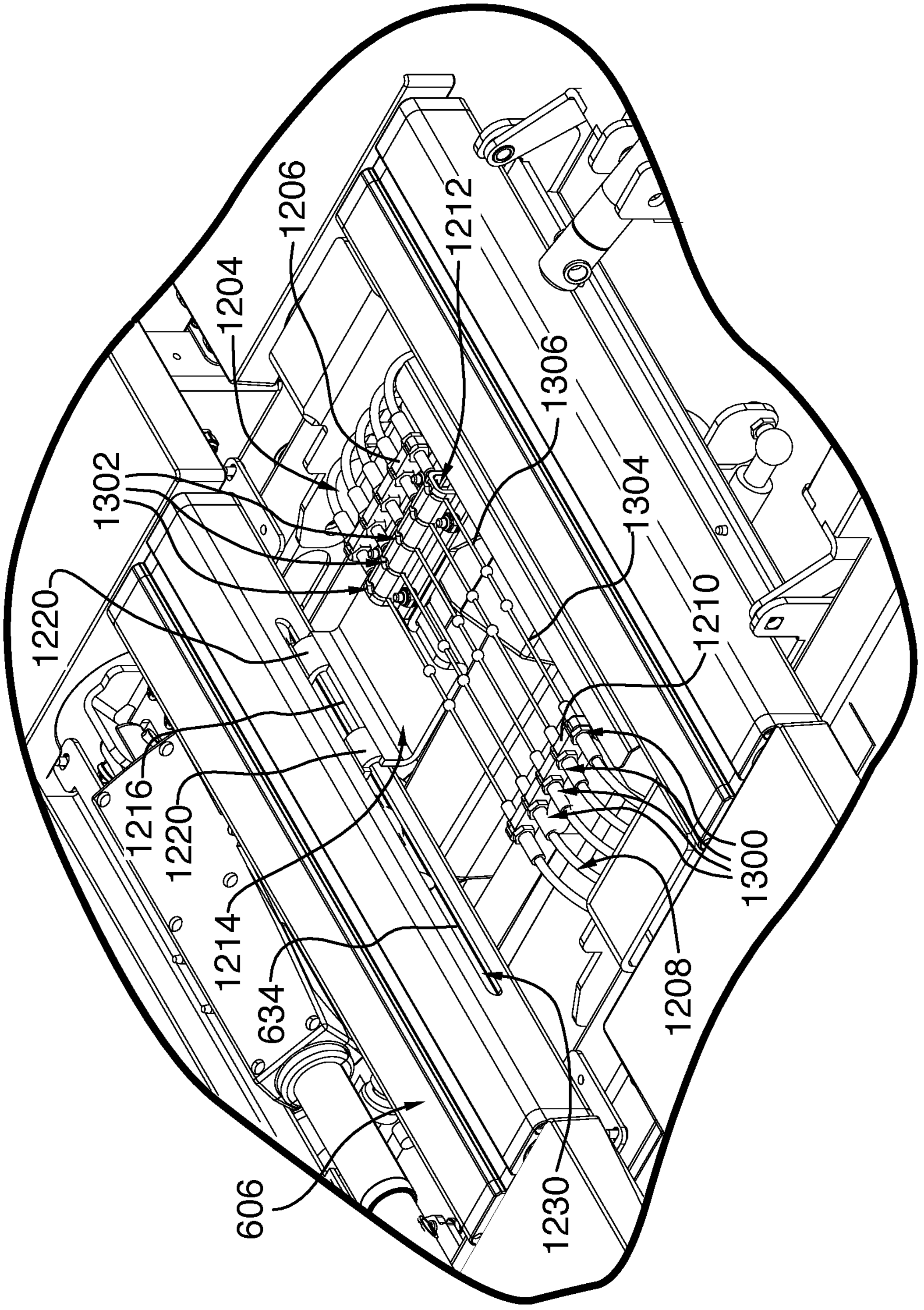
FIG. 13 is an enlarged perspective view of the patient support assembly illustrated in FIG. 12.
Figure 13A:
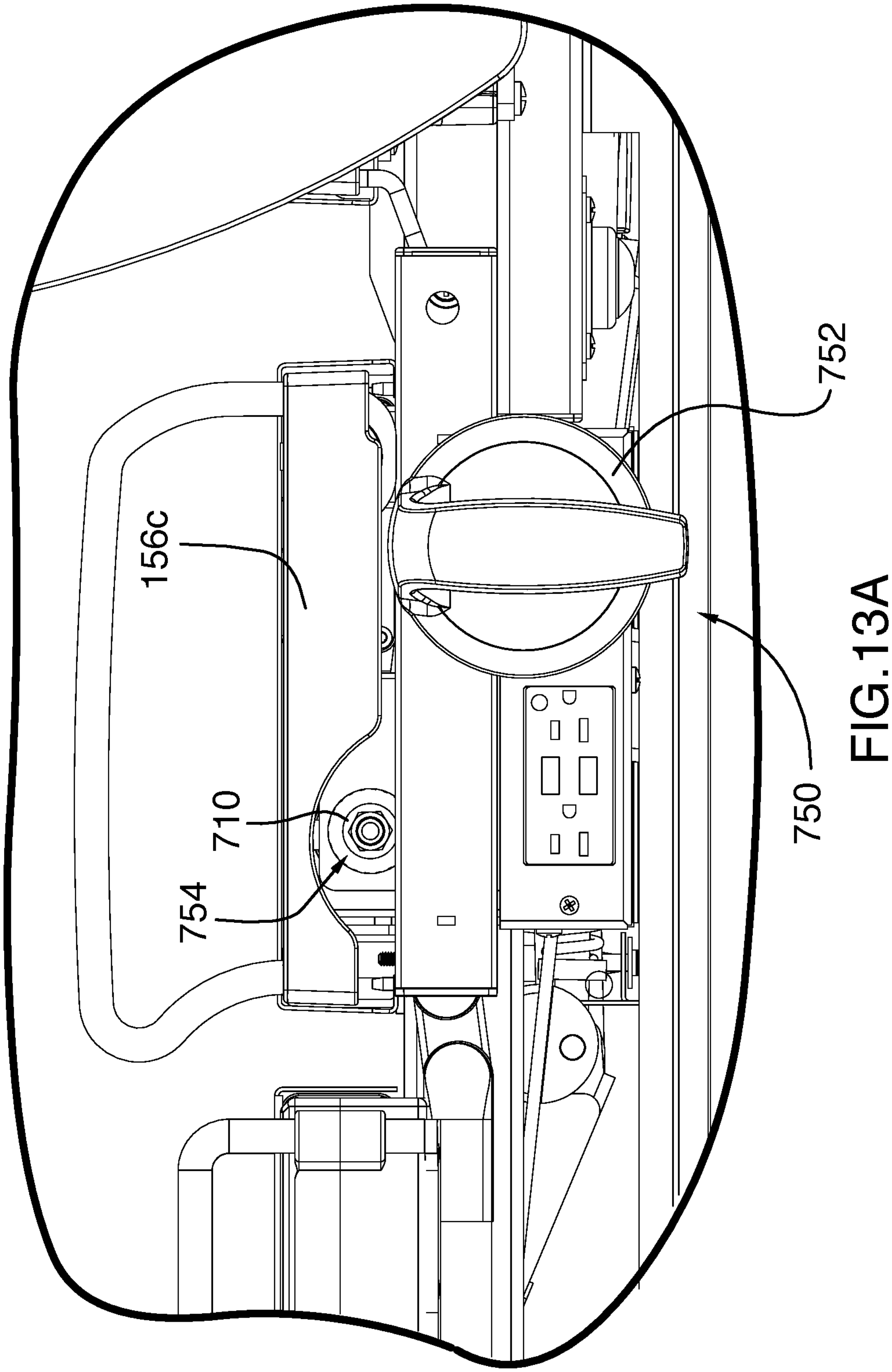
FIG. 13A is an enlarged side elevation view of the patient support assembly illustrated in FIG. 13, showing details of the manual actuation assembly.
Figure 14:
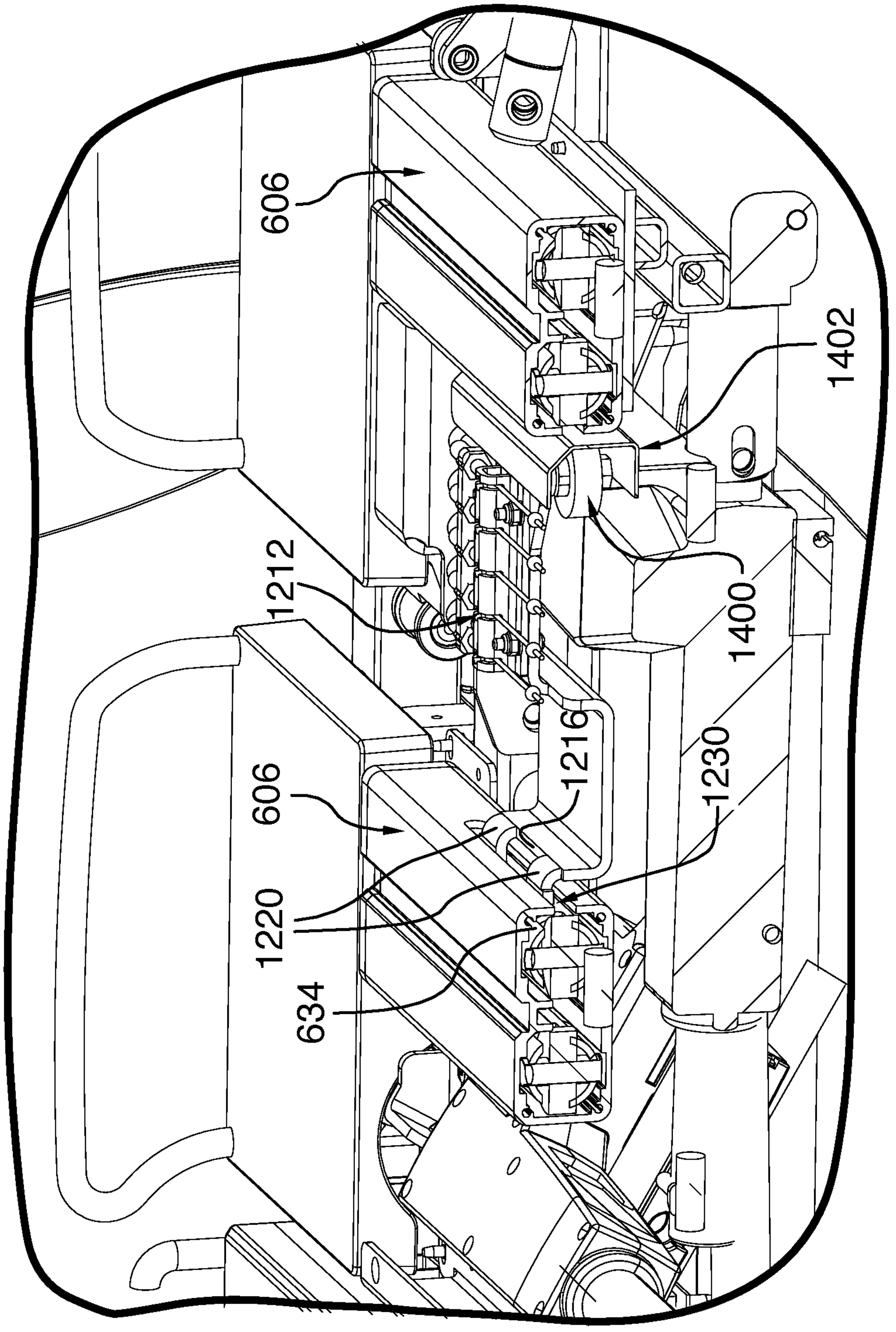
FIG. 14 is a perspective cross-section view, taken along cross-section line XIV-XIV of FIG. 12, showing further details of the movement transmission assembly including the movable base.

Referring now specifically to FIGS. 12 to 14, each cable 1102 includes a cable core 1200 and a sheath 1202 surrounding the cable core 1200. In the illustrated embodiment, the sheath 1202 includes a first sheath portion 1204 extending between a first cable rack 1206 and the corresponding rod and a second sheath portion 1208 extending between a second cable rack 1210 spaced from the first cable rack 1206 and the corresponding rod.

Each cable rack 1206, 1210 includes a plurality of spaced-apart sheath connectors 1300, best shown in FIG. 13, which prevent movement of the sheath 1202 but allow axial movement of the cable core 1200 within the sheath 1202.

Still referring to FIGS. 12 to 14, the control cables 1102 are further connected together such that movement of one of the control cables causes movement of at least one other control cable. In the illustrated embodiment, the transmission assembly 1100 includes an elongated bar connector 1212 which is adapted to engage all of the control cables 1102. Specifically, the bar connector 1212 is generally elongated and is disposed transversely across the control cables 1102, between the first and second cable racks 1206, 1210. The bar connector 1212 includes a plurality of spaced-apart notches 1302, each notch 1302 being adapted to receive the cable core 1200 of a corresponding cable.

In the illustrated embodiment, each control cable 1102 includes two pairs of cable segments 1304, 1306 disposed end-to-end. Each cable segment 1304, 1306 includes an end ball 1308 which is adapted to be secured in a corresponding notch 1302 of the bar connector 1212. According to this configuration, lateral movement of the bar connector 1212 therefore pulls on the control cables 1102 in one direction or the other. Furthermore, pulling on one of the control cables 1102 will cause lateral movement of the bar connector 1212.

Alternatively, instead of including two pairs of cable segments 1304, 1306, each control cable 1102 made be made of a single, unitary cable segment secured to the bar connector 1212.

In the illustrated embodiment, the bar connector 1212 is further secured on a movable base 1214 which engages a guiding mechanism. Specifically, the movable base 1214 is made from a substantially flat sheet of metal and has a headward side edge 1216 and an opposite footward side edge 1218.

Specifically, a pair of tabs 1220 extend generally horizontally from the headward side edge 1216 towards the head end 102 of the bed 100 and slidably engage an elongated groove 1230 defined in the sleeve 606 receiving the left and right rods 632, 634 of the left and right first core side sections 156*b*, 156*c*. In the illustrated embodiment, the tabs 1220 further extend beyond the groove 1230 inside the sleeve 606 and engage the right rod 634 of the right first core section 156*c* such that lateral movement of the right first core section 156*c* causes lateral movement of the movable base 1214, which in turn pulls on the control cables 1102.

In the illustrated embodiment, the movable base 1214 further includes a plurality of rollers 1400 adapted to be received in a generally C-shaped channel 1402 which is located near the sleeve 606 receiving the left and right rods 640, 642 of the left and right second core side sections 158*b*, 158*c*. It will be appreciated that in this configuration, the movable base 1214 maintains the bar connector 1212 oriented perpendicular to the control cables 1102 to ensure that every control cable 1102 connected to the bar connector 1212 moves simultaneously by the same distance.

Figure 6:
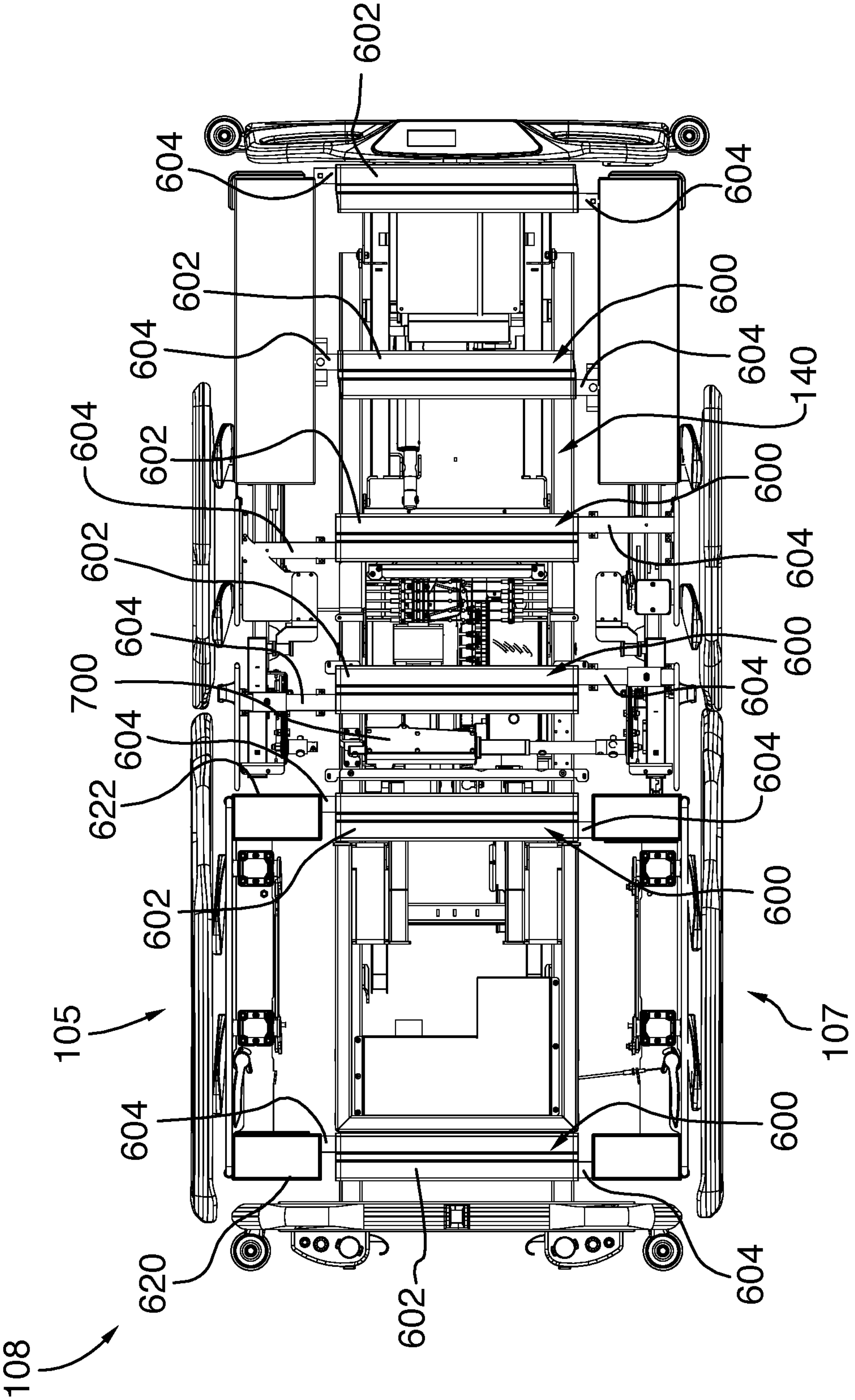
FIG. 6 is a top plan view of the patient support assembly illustrated in FIG. 2, with the central sections of the patient support surface removed.
Figure 7:
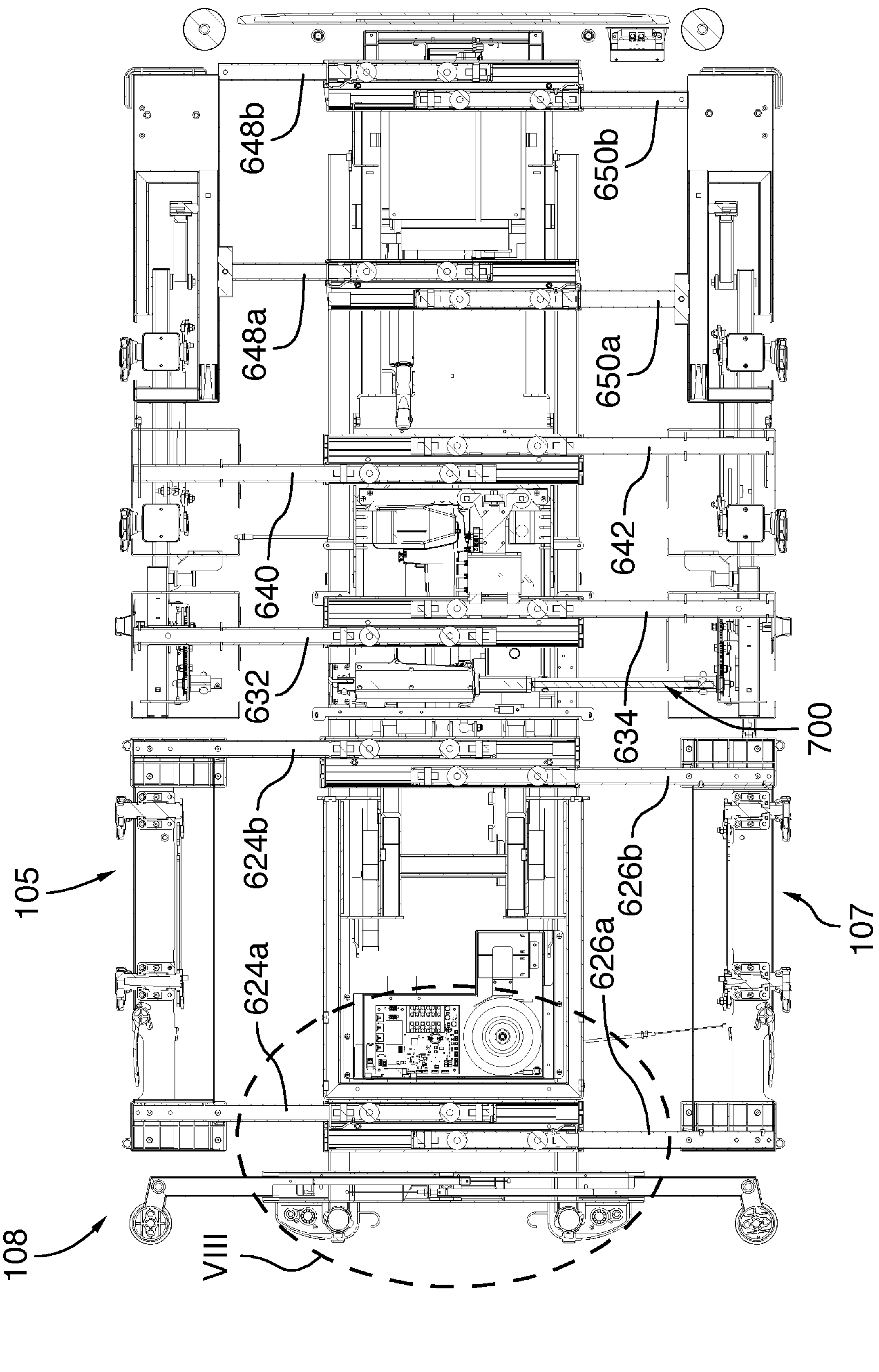
FIG. 7 is a top cross-sectioned view of the patient support assembly illustrated in FIG. 6, showing the interior of the sliding mechanism.
Figure 8:
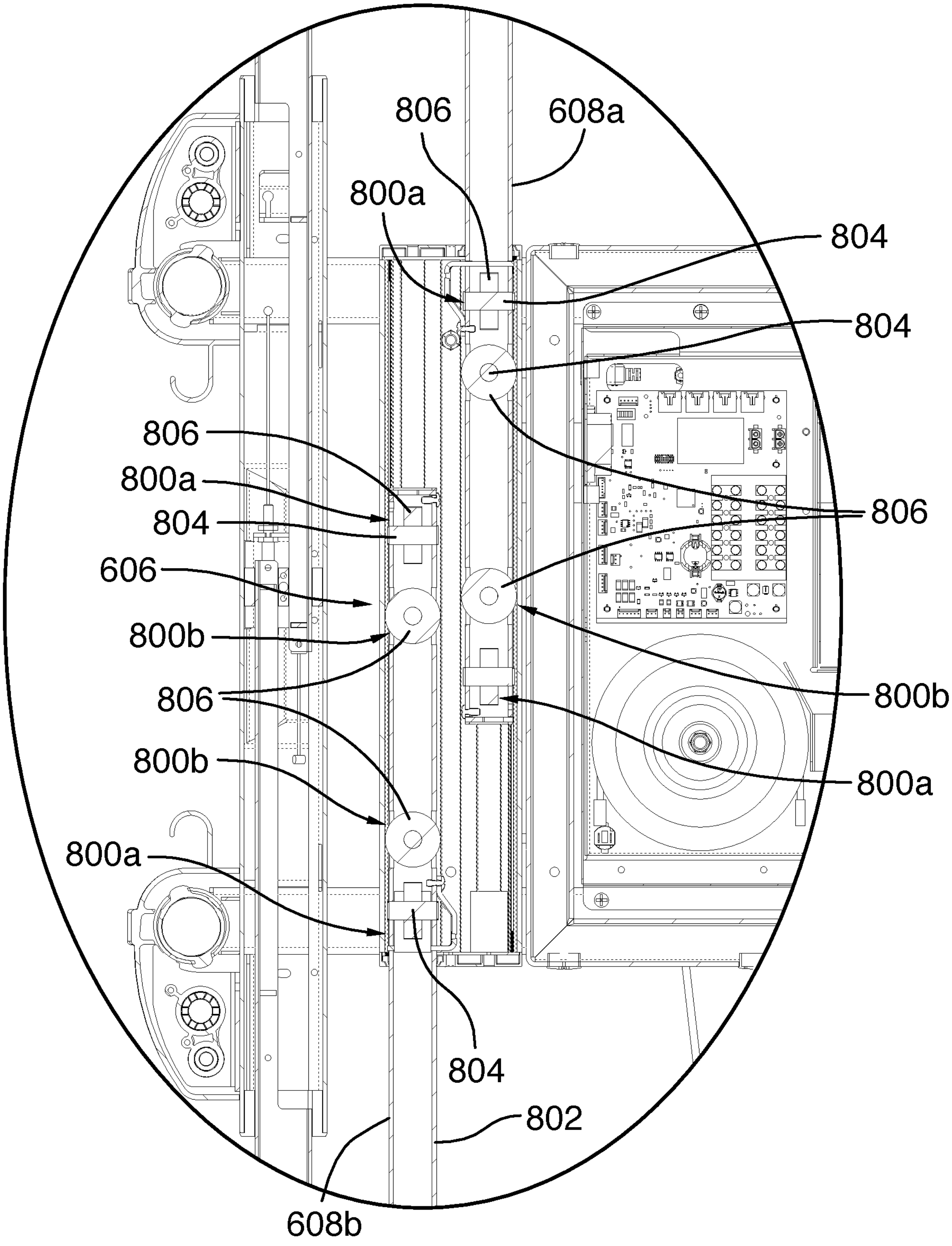
FIG. 8 is an enlarged top plan view, taken in area VIII, of the sliding mechanism illustrated in FIG. 7.
Figure 8B:
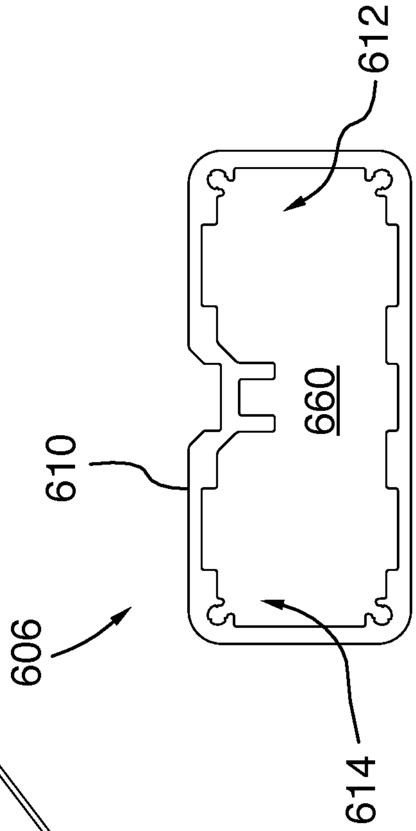
FIG. 8B is a front elevation view of the sleeve illustrated in FIG. 8A.
Figure 8A:
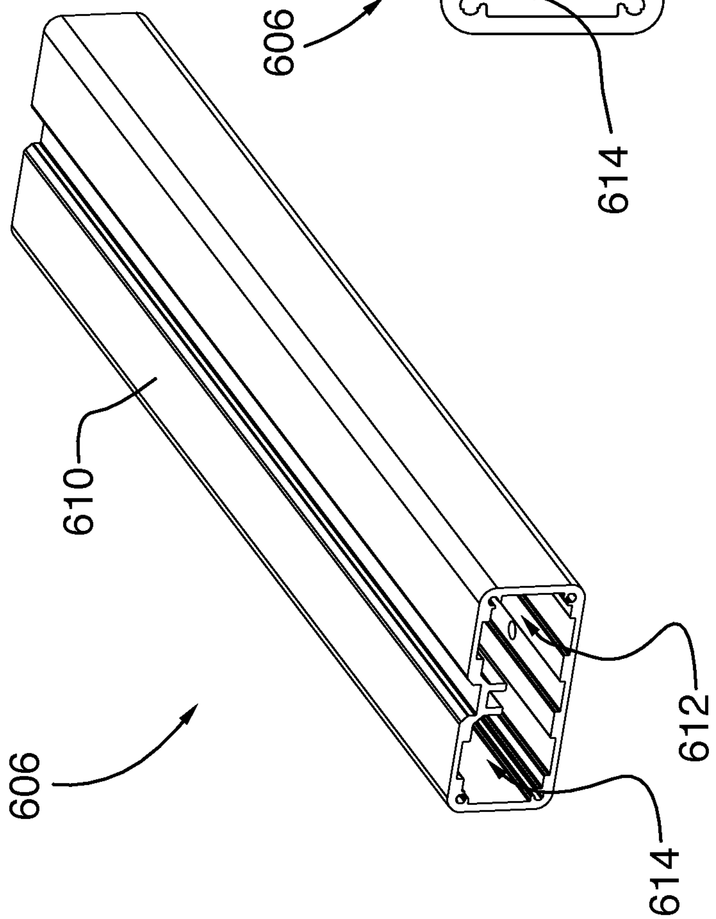
FIG. 8A is a perspective view of a sleeve for the sliding mechanism illustrated in FIG. 8.
Figure 8C:
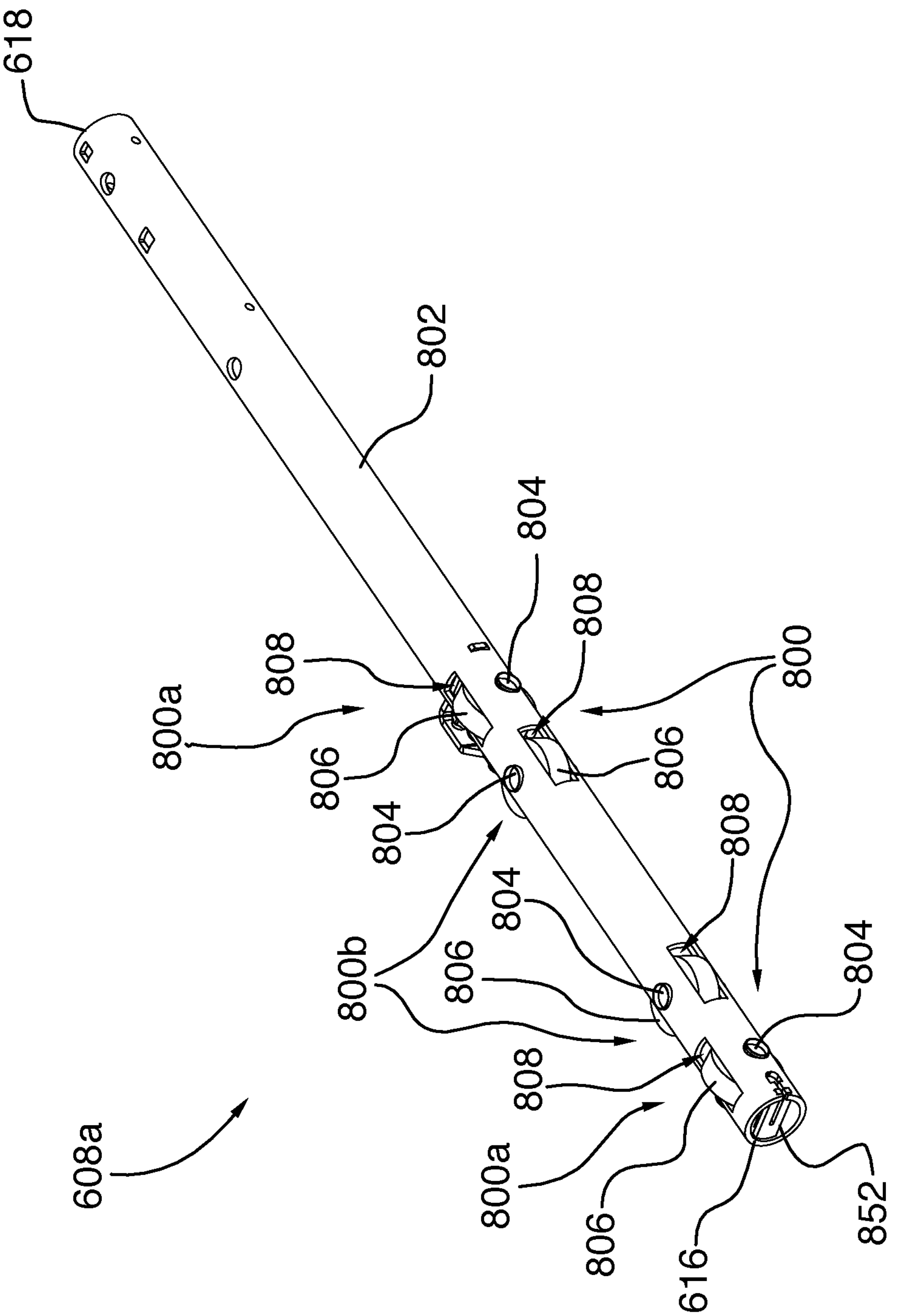
FIG. 8C is a top perspective view of a rod for the sliding mechanism illustrated in FIG. 8.
Figure 8D:
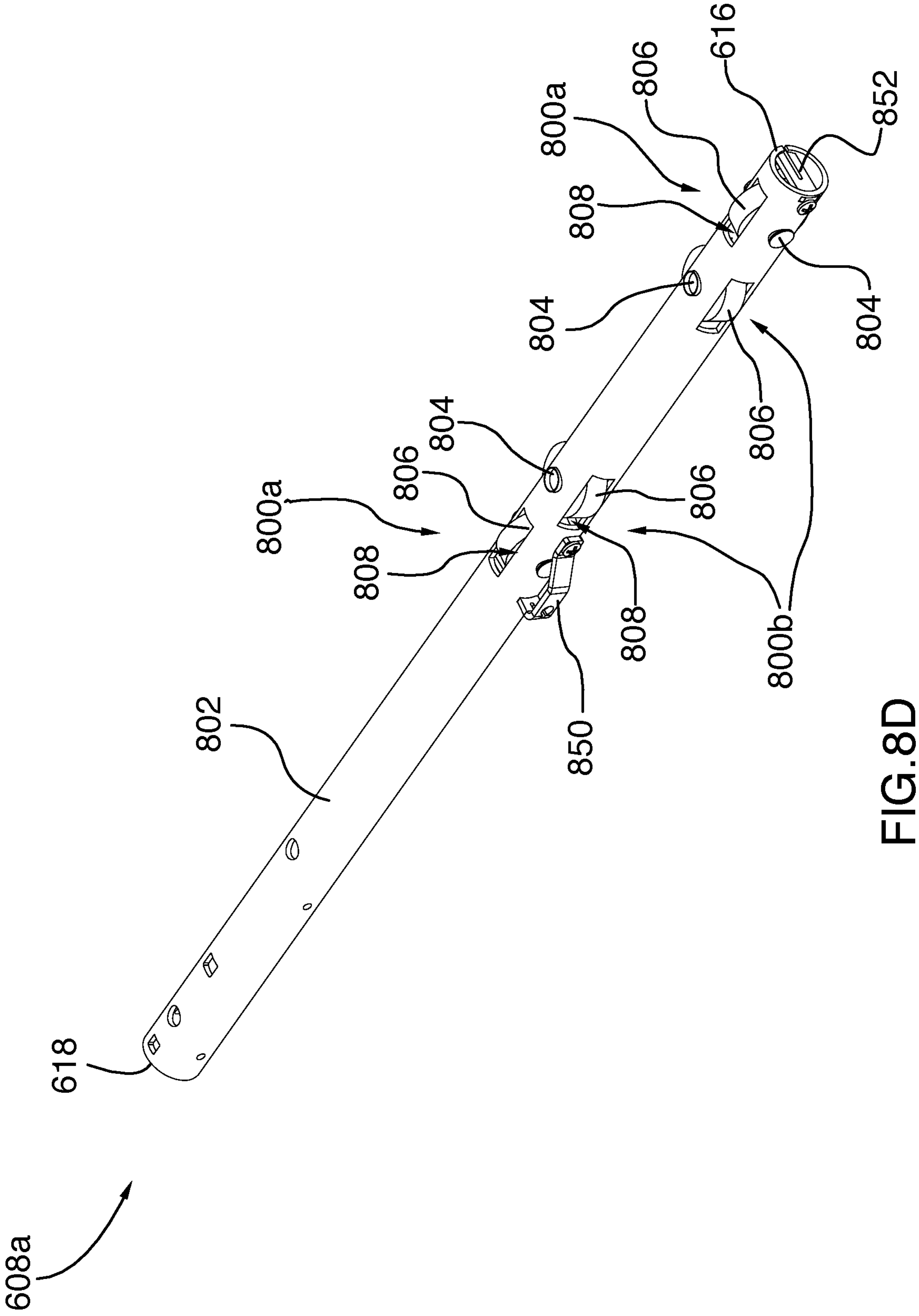
FIG. 8D is another top perspective view of a rod for the sliding mechanism illustrated in FIG. 8.

As best shown in FIGS. 6, 7 and 12, the bed 100 further comprises an actuation mechanism 700 for moving a first side section in a first lateral direction and thereby cause lateral movement of another side section.

In the illustrated embodiment, the actuation mechanism 700 includes a width adjustment actuator 702 operatively connected to at least one of the control cables 1102 and the side sections 302*a*, 302*b* to selectively pull the control cables 1102 in one of a first direction and a second, opposite direction.

Referring specifically to FIG. 12, the width adjustment actuator 702 comprises a linear actuator having a first end 704 secured to the frame 140 and a second end 706 secured to the right first core side section 156*c*. Specifically, the actuator 702 could include a housing 708 located at the first end 704, an internally-threaded nut (not shown) rotatably mounted in the housing, a motor (also not shown) mounted in the housing 708 and operatively coupled to the nut for rotating the nut and a threaded rod 710 threadably engaging the nut and extending from the housing 708 towards the second end 706 of the actuator 700. It will be understood that the threaded rod 710 can be extended or retracted by rotation of the nut relative to the threaded rod 710. This can be accomplished by rotating the nut using the motor while preventing rotation of the threaded rod 710 to thereby convert rotation of the nut into axial translation of the threaded rod 710. Alternatively, the width adjustment actuator 702 could include one of various other types of linear actuators such that a hydraulic actuator, a pneumatic actuator or the like.

The width adjustment actuator 702 is further operatively connected to a controller, such as the control interface of the bed 100 for example, to allow a user to selectively extend and retract the actuator 702. Alternatively, the width adjustment actuator 702 could be operatively connected to a controller which is distinct from the control interface of the bed 100.

In one embodiment, the controller allows the width adjustment actuator 702 to be extended or retracted to a desired length in accordance with a desired width of the bed 100.

To increase the width of the bed 100, the user extends the actuator 702, which moves the right first core side section 156*c* and the right rod 634 of the right first core side section 156*c* laterally rightwardly. As explained above, the movable base 1214 engages the right rod 634 and therefore also moves laterally rightwardly, thereby pulling on all of the control cables 1102 in a first direction. According to the configuration described above, this causes the side sections 302*a*, 302*b* to move laterally away from the central sections 300 and thereby to widen the patient support surface 150. It also causes the left and right headboard portions 904, 906 to move away from each other to thereby increase the width of the headboard 112.

Since all control cables 1102 are pulled simultaneously, all of the side sections 302*a*, 302*b* move by the same distance and at the same speed, and the headboard 112 is therefore widened as the patient support surface 150 is widened without any gap being created between the headboard 112 and the left and right head siderails 126, 128.

It will therefore be appreciated that according to this system, a single actuator is used to move laterally all side sections 302*a*, 302*b* of the patient support surface 150, which reduces the costs and the complexity of the bed 100. It will also be appreciated that all side sections 302*a*, 302*b* move together in unison when a single one of the side sections is moved, thereby eliminating the need to move each side section individually. Furthermore, side sections 302*a*, 302*b* on opposite sides of the bed 100 move together as mirror images of each other, thereby eliminating the need for the user to walk around the bed 100 to extend side sections 302*a*, 302*b* on both sides of the bed 100.

In one embodiment, the adjustment mechanism 700 further includes a manual actuation assembly 750 operatively coupled to the width adjustment actuator 702. The manual actuation assembly 750 could be used as a backup system for moving the side sections if the motor of the width adjustment actuator 702 was to fail. The manual actuation assembly 750 could also be used for microadjustments of the bed's width, or by a user who prefers to adjust the bed's width manually rather than by using the width adjustment actuator 702.

In the illustrated embodiment, the manual actuation assembly 750 includes a handle 752 rotatably mounted to the frame 140 and operatively connected to the threaded rod 710 of the width adjustment actuator 702 for enabling the threaded rod 710 to be rotated manually by rotating the handle 752. Still in the illustrated embodiment, when the motor is not rotating the internally-threaded nut, the nut is prevented from rotating. Therefore, it will be appreciated that the rotation of the threaded rod 710 relative to the non-rotating nut will cause the threaded rod 710 to extend or retract, depending on the direction in which the handle 752 is rotated.

Still in the illustrated embodiment, the handle 752 is operatively connected to the threaded rod 710 via a plurality of intermeshed sprockets 754 which transmit rotation of the handle 752 to the threaded rod 710. Alternatively, the handle 752 could instead be disposed coaxially with the threaded rod 710 such that the handle 752 may be rotated directly about the threaded rod's longitudinal axis, without requiring any sprocket. Alternatively, the adjustment mechanism 700 may not include any manual actuation assembly.

In yet another embodiment, the adjustment mechanism 700 may not comprises a motor. Specifically, the adjustment mechanism 700 may only comprise the manual actuation assembly 750 and the threaded rod 710 and the internally-threaded nut of the adjustment mechanism 700. In this embodiment, manual rotation of the handle 752 would be the only means to move the side sections laterally.

Figure 15:
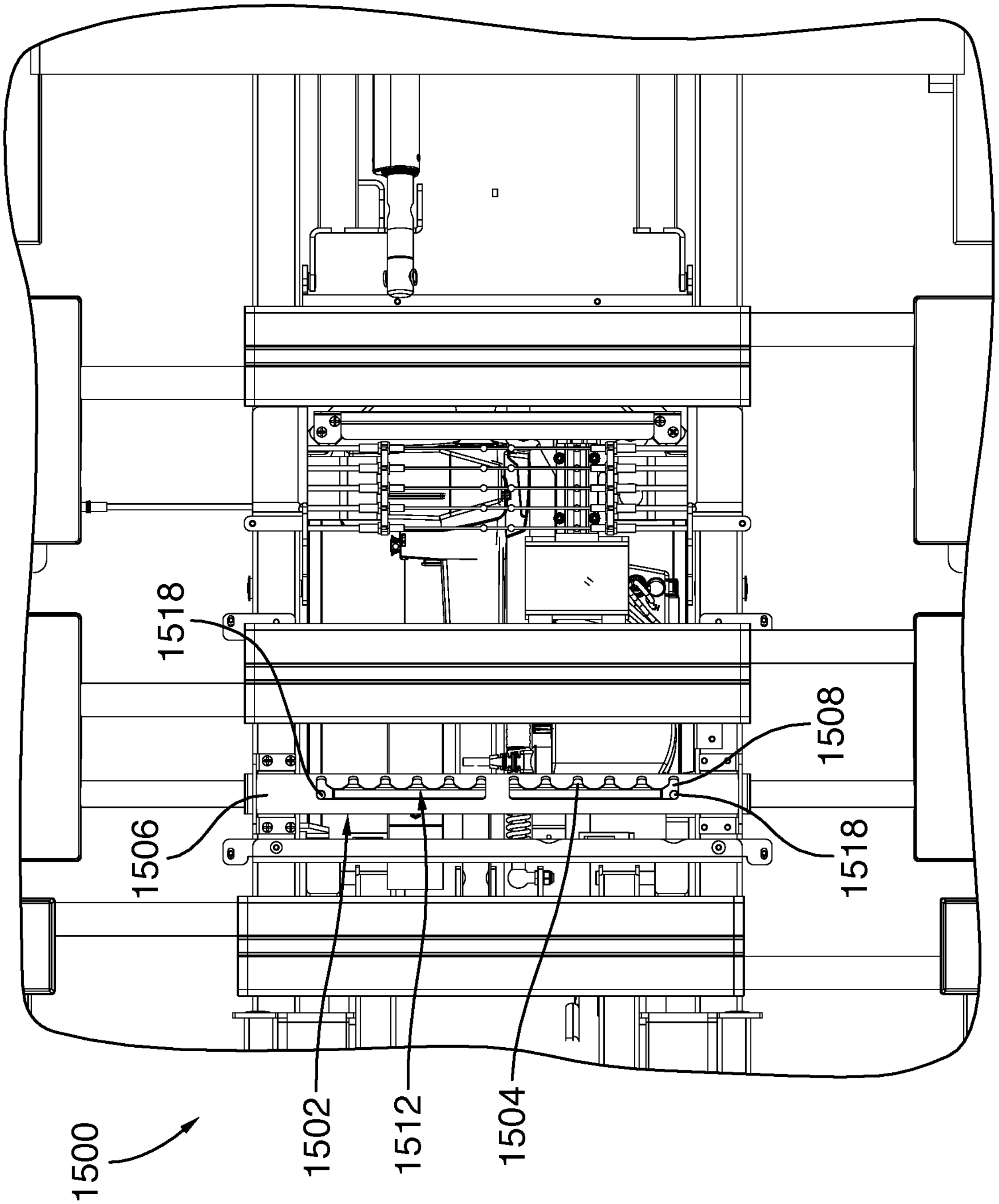
FIG. 15 is an enlarged top plan view of a patient support assembly of a hospital bed, in accordance with an alternative embodiment which includes a width locking assembly.
Figure 16:
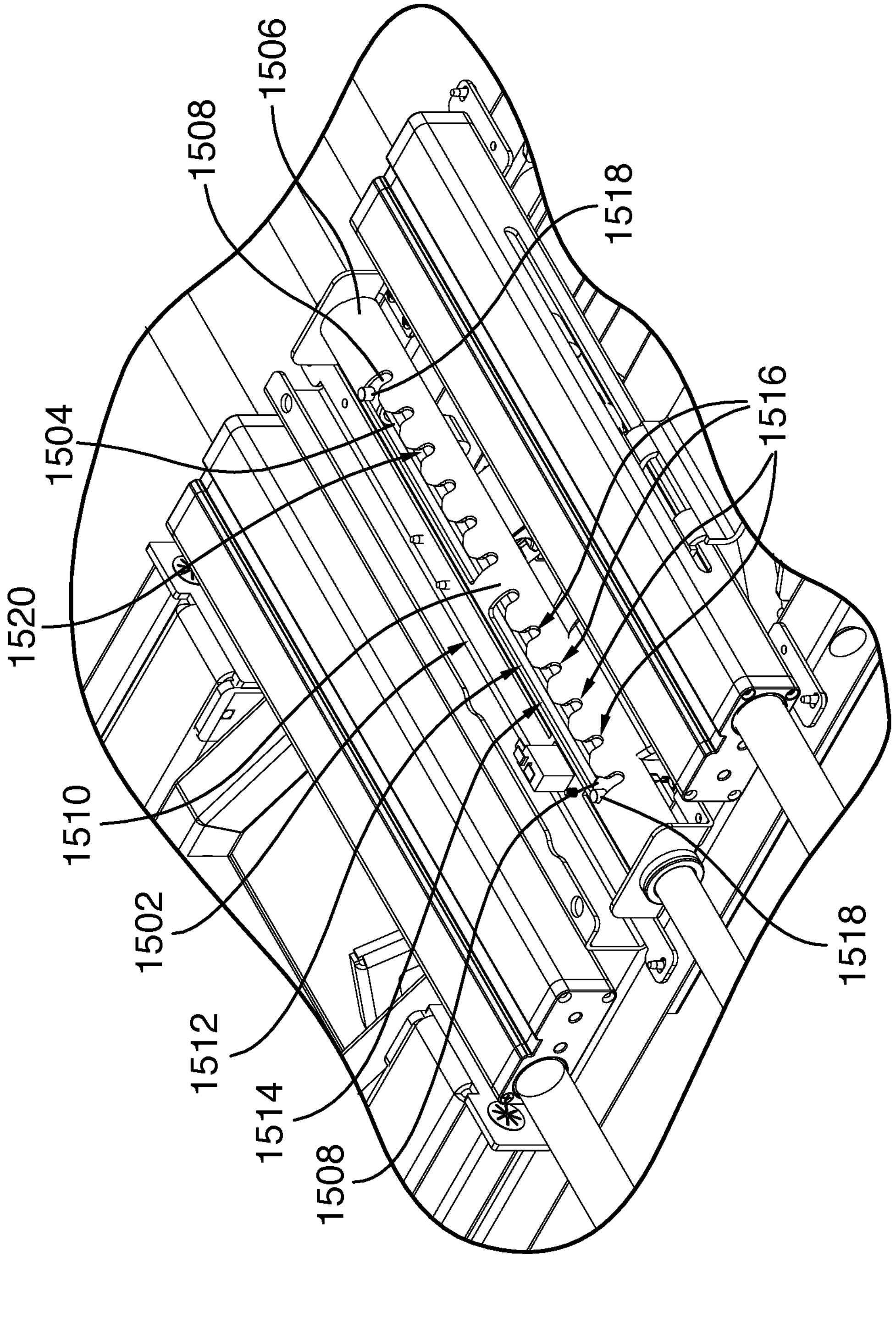
FIG. 16 is an enlarged perspective view of the patient support assembly illustrated in FIG. 15.
Figure 17:
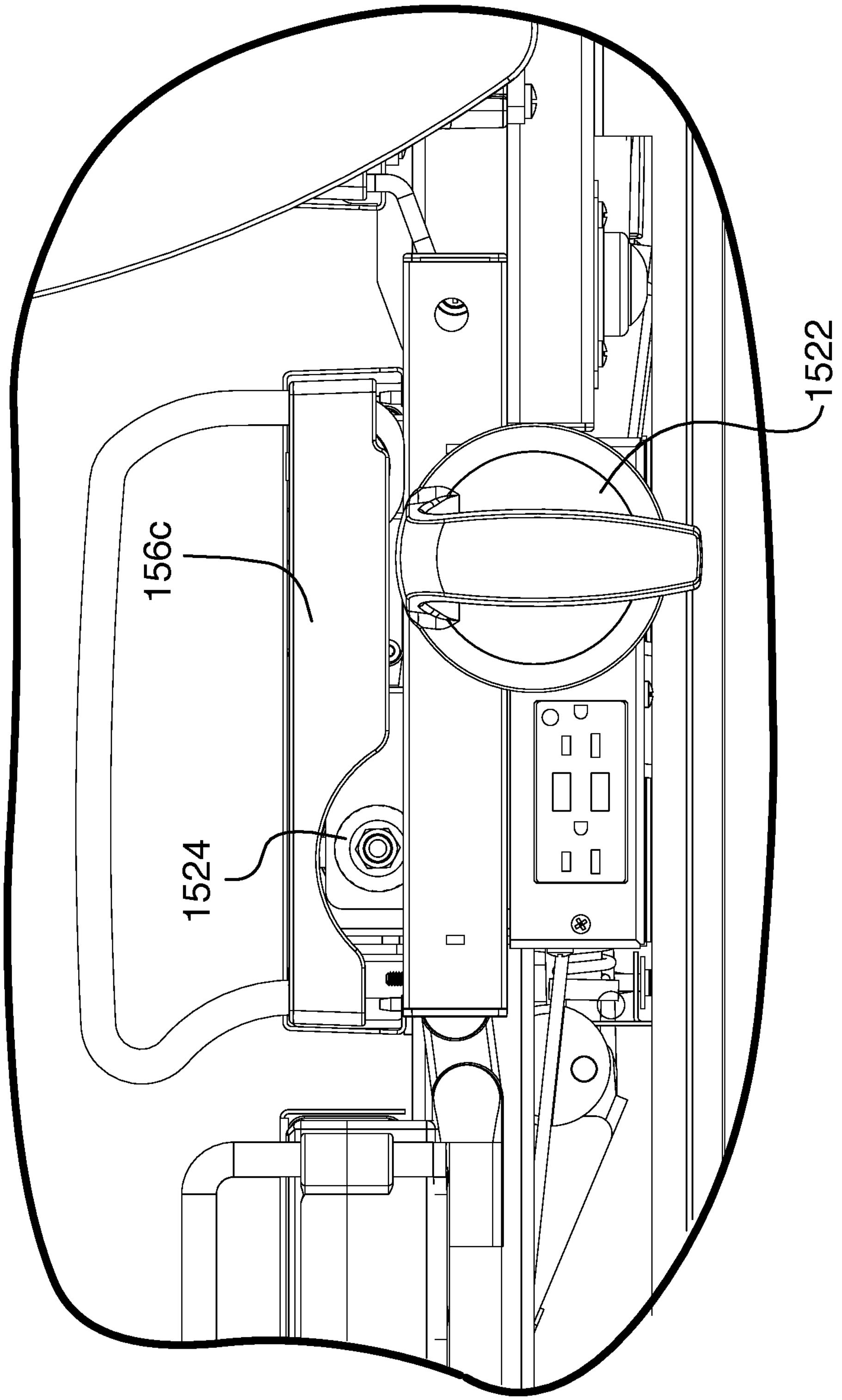
FIG. 17 is an enlarged side elevation view of the patient support assembly illustrated in FIG. 15, showing the handle and further details of the width locking assembly.

FIGS. 15 to 17 show a hospital bed 1500, in accordance with an alternative embodiment. The hospital bed 1500 is generally similar to the bed 100 illustrated in FIGS. 1 to 14, except that it does not include a width adjustment actuator 700.

Instead, the width of the patient support surface 150 is adjusted by manually moving at least one of the side sections 302*a*, 302*b* towards or away from the corresponding central section 300. It will be understood that moving a given one of the side sections 302*a*, 302*b* laterally will pull on the corresponding control cable in a corresponding direction. As explained above, the transmission assembly 1100 is configured to move all control cables 1102 simultaneously in the same direction and by the same distance, and therefore will cause all side sections 302*a*, 302*b* to move simultaneously to thereby increase or decrease the width of the bed 1500.

Therefore, movement of one of the side sections towards or away from the corresponding central section by a certain distance will cause movement of the remaining side sections towards or away from the central sections by the same certain distance.

In the embodiment illustrated in FIGS. 15 and 16, the hospital bed 1500 further includes a width locking assembly 1502 mounted to the patient support assembly 150 for preventing further lateral movement of the side sections 302*a*, 302*b* once a desired width of the bed 1500 has been attained. Specifically, the width locking assembly 1502 includes a central shaft 1504 which extends transversely to the bed 1500, an outer locking tube 1506 disposed around the central shaft 1504 and a pair of inner locking tubes 1508 disposed concentrically between the central shaft 1504 and the outer locking tube 1506.

The outer locking tube 1506 extends substantially the entire width of the patient support surface 150 and includes a sidewall 1510 in which is defined an elongated indent 1512 extending generally parallel to a longitudinal axis of the outer locking tube 1506. The elongated indent 1512 includes a relatively narrow linear portion 1514 and a plurality of spaced-apart notches 1516 extending substantially perpendicularly to the linear portion 1514, all on a same side thereof.

In the illustrated embodiment, each one of the pair of inner locking tubes 1508 is adapted to move laterally with a corresponding one of the left and right first core side sections **156*b*, 156*c*, but is allowed to rotate relative to the corresponding first core side sections 156*b*, 156*c***.

Furthermore, each inner locking tube 1508 is allowed to move axially relative to the central shaft 1504, but rotation of the inner locking tube 1508 causes rotation of the central shaft 1504. Specifically, the locking assembly 1502 further includes a pin 1518 which extends radially through a longitudinal groove 1520 of the central shaft 1504 and through the inner locking tube 1508. The pin 1518 further extends beyond the inner locking tube 1508 and through the elongated indent 1512 of the outer locking tube 1506. The width locking assembly 1502 can therefore selectively be set in a locked configuration in which the pin 1518 engages one of the notches 1516 of the indent 1512 and in which axial movement of the inner locking tube 1508, and thereby lateral movement of the side sections **302*a*, 302*b*, is prevented, and in an unlocked configuration in which the pin 1518 engages the linear portion 1514 of the indent 1512 and the side sections 302*a*, 302*b* can therefore be moved laterally. It will be understood that the notches 1516 define a plurality of discrete positions in which the side sections 302*a*, 302*b*** can be positioned and locked.

Referring specifically to FIG. 17, the width locking assembly 1502 further includes a handle 1522 operatively connected to one of the inner locking tubes 1508. In the illustrated embodiment, the handle 1522 is located under the first core support panel 156. Still in the illustrated embodiment, the handle 1522 is operatively connected to the inner locking tube 1508 via a plurality of intermeshed sprockets 1524 which transmit rotation of the handle 1522 to the inner locking tube 1508. Alternatively, the handle 1522 could instead be disposed coaxially with the inner locking tube 1508 such that the handle 1522 may be rotated directly about the locking tube's longitudinal axis, without requiring any sprocket.

In one embodiment, the bed 1500 includes a similar handle on the opposite side of the bed 1500 to thereby allow a user to adjust the width of the bed 1500 while standing on either side of the bed 1500. Alternatively, the bed 1500 may comprise only a single handle and may be operated only from a single side of the bed 1500. In this embodiment, the width locking assembly 1502 could comprise only a single inner locking tube instead of a pair of locking tubes 1508.

In one embodiment, the handle 1522 and/or the locking tubes 1508 could be spring biased towards the locked position to prevent accidentally adjusting the width of the bed 1500, if one of the side sections **302*a*, 302*b*** were to be inadvertently pushed for example.

When the locking assembly 1502 is in the locked configuration, the pins 1518 engage notches 1516 of the outer locking tube 1506. By rotating the handle 1522, the inner locking tube 1508 rotates relative to the outer locking tube 1506 and the pins 1518 exit the notches 1516 and move into the linear portion 1514 of the indent 1512. The user can then push or pull the handle 1522 to move the side sections **302*a*, 302*b* laterally. Once the desired position has been reached, the user can rotate the handle 1522 back into its original position to move the pins 1518** back into notches and thereby place the bed in a locked configuration. Alternatively, if the handle is biased towards the locked position, the user could simply let go of the handle, which would rotate back by itself into the locked position.

In another embodiment, instead of manually pushing or pulling on a side section **302*a*, 302*b*, the bed 1500 could be provided with an endless screw which could engage one of the side sections 302*a*, 302*b* such that rotation of the endless screw would move the side section laterally towards or away from the central section. In this embodiment, the bed 1500** could be provided with a crank-type handle to allow the user to rotate the screw.

In yet another embodiment, the side sections could be biased away from the central sections and the bed could comprise an actuator for moving the side sections towards a contracted configuration and maintaining the side sections in the contracted configuration.

We claim:

1. A hospital bed, comprising:

a frame;

a plurality of extendable patient support panels mounted to the frame, each patient support panel including a central section and at least one coplanar side section selectively movable laterally towards and away from the central section, the at least one coplanar side section being slidably connected to the corresponding central section;

a slide mechanism to allow sliding movement of the at least one side section relative to the central section; and a width locking assembly operatively connected to the at least one side section, the width locking assembly being movable between a locked configuration in which lateral movement of the at least one side section is prevented and an unlocked configuration which allows lateral movement of the at least one side section, the width locking assembly comprising:

- a handle that is movable by a user between a locked position corresponding to the locked configuration and an unlocked position corresponding to the unlocked configuration;
- a locking tube extending laterally of the bed and defining at least one elongated indent, the at least one elongated indent comprising a linear portion and a plurality of notches extending from the linear portion, the notches corresponding to predetermined discrete positions of the at least one side section; and
- a pin operatively connected to the handle and movable along a length of the at least one elongated indent, the pin being selectively rotated into the notches by moving the handle to the locked position in order to lock the at least one side section in one of the predetermined discrete positions.

2. The hospital bed as claimed in claim 1, wherein the slide mechanism includes a first slide member secured to at least one of the frame and the central section and a second slide member secured to one of the at least one side sections, the second slide member being slidably connected to the first slide member.

3. The hospital bed as claimed in claim 2, wherein the first slide member includes a sleeve and the second slide member includes a rod slidably engaging the sleeve.

4. The hospital bed as claimed in claim 3, wherein the sleeve includes a first bore for receiving a first rod secured to a first side section and a second bore parallel to the first bore for receiving a second rod secured to a second side section located opposite the first side section.

5. The hospital bed as claimed in claim 1, wherein the at least one side section is movable between a stowed position in which the at least one side section is located within the central section and an extended position in which the at least one side section extends away from the central section.

6. The hospital bed as claimed in claim 1, including a movement transmission assembly including a transmission member connecting first and second side sections for laterally moving at least one of the first and second side sections when another one of the first and second side sections is moved, wherein the transmission member includes: a plurality of flexible control cables; and a width adjustment actuator operatively connected to at least one of the plurality of flexible control cables and to the first and second side sections to selectively pull the at least one of the plurality of flexible control cables in one of a first direction and a second direction opposite the first direction.

7. The hospital bed as claimed in claim 6, wherein the width adjustment actuator includes a linear actuator including a first end secured to the frame and a second end secured to one of the first and second side sections.

8. The hospital bed as claimed in claim 7, wherein the plurality of flexible control cables interconnect the first and second side sections.

9. The hospital bed as claimed in claim 7, wherein the control cables are connected together such that movement of one of the control cables causes movement of at least one other control cable.

10. The hospital bed as claimed in claim 7, wherein each control cable is connected to one of the first and second side sections and wherein each control cable includes a first cable end connected to a corresponding side section and a second cable end connected to the same corresponding side section.

11. The hospital bed as claimed in claim 10, wherein the first and second cable ends point towards each other such that pulling the control cable in a first direction moves the corresponding side section laterally in a first lateral direction and pulling the control cable in a second direction opposite the first direction moves the corresponding side section laterally in a second lateral direction opposite the first lateral direction.

12. The hospital bed as claimed in claim 6, including an extendable headboard mounted to the frame, the headboard including a first headboard portion and a second headboard portion slidably connected to the first headboard portion, the first and second headboard portions being operatively connected to the movement transmission assembly for selectively moving the first and second headboard portions towards and away from each other when one of the first and second side sections is moved laterally.

13. The hospital bed as claimed in claim 1, including a movement transmission assembly including a transmission member connecting first and second side sections for laterally moving one of the first and second side sections when another one of the first and second side sections is moved, wherein the transmission member includes a plurality of flexible control cables, wherein each control cable is connected to one of the first and second side sections and includes a first cable end connected to a corresponding side section and a second cable end connected to the same corresponding side section.

14. The hospital bed as claimed in claim 13, wherein the plurality of flexible control cables interconnect all of the first and second side sections.

15. The hospital bed as claimed in claim 13, wherein the control cables are connected together such that movement of one of the control cables causes movement of at least one other control cable.

16. The hospital bed as claimed in claim 13, including a width adjustment actuator operatively connected to at least one of the control cables and to the first and second side sections to selectively pull the control cables in one of a first direction and a second direction opposite the first direction.

17. The hospital bed as claimed in claim 13, wherein the first and second cable ends point towards each other such that pulling the control cable in a first direction moves the corresponding side section laterally in a first lateral direction and pulling the control cable in a second direction opposite the first direction moves the corresponding side section laterally in a second lateral direction opposite the first lateral direction.

18. A hospital bed, comprising:

a frame;

a plurality of extendable patient support panels mounted to the frame, each patient support panel comprising a central section and first and second side sections selectively movable laterally towards and away from the central section, one of the first and second coplanar side sections being slidably connected to the central section;

a slide mechanism to allow sliding movement of one the first and second side sections relative to the central section; and a movement transmission assembly including a transmission member connecting the first and second side sections for laterally moving one of the first and second side sections when another one of the first and second side sections is moved, wherein the transmission member includes a plurality of flexible control cables, wherein each control cable is connected to one of the first and second side sections and includes a first cable end connected to a corresponding side section and a second cable end connected to the same corresponding side section.

19. The hospital bed of claim 1, wherein the handle is biased towards the locked position.

* * * * *